US010908723B2

(12) United States Patent
Kim et al.

(10) Patent No.: US 10,908,723 B2
(45) Date of Patent: Feb. 2, 2021

(54) TOUCH SENSOR AND DISPLAY DEVICE

(71) Applicant: Samsung Display Co., Ltd., Yongin-si (KR)

(72) Inventors: Ga Young Kim, Hwaseong-si (KR); Jang Hui Kim, Suwon-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/560,318

(22) Filed: Sep. 4, 2019

(65) Prior Publication Data
US 2020/0117305 A1 Apr. 16, 2020

(30) Foreign Application Priority Data

Oct. 15, 2018 (KR) .......................... 10-2018-0122358

(51) Int. Cl.
G06F 3/041 (2006.01)
G06F 3/044 (2006.01)
G06F 3/045 (2006.01)

(52) U.S. Cl.
CPC ............ *G06F 3/0412* (2013.01); *G06F 3/044* (2013.01); *G06F 3/045* (2013.01); *G06F 3/0443* (2019.05);
(Continued)

(58) Field of Classification Search
CPC ........ G06F 3/0412; G06F 3/044; G06F 3/045; G06F 3/0443; G06F 3/0414;
(Continued)

(56) References Cited

U.S. PATENT DOCUMENTS

2008/0309633 A1* 12/2008 Hotelling ................ G06F 3/044
345/173
2010/0128002 A1* 5/2010 Stacy ...................... G06F 3/044
345/174
(Continued)

FOREIGN PATENT DOCUMENTS

EP 3324277 5/2018
GB 2525174 10/2015
KR 10-2019-0132600 11/2019

OTHER PUBLICATIONS

Partial European Search Report dated Mar. 23, 2020, issued in European Patent Application No. 19202843.9.

Primary Examiner — Adam J Snyder
(74) Attorney, Agent, or Firm — H.C. Park & Associates, PLC

(57) ABSTRACT

A display device includes: a base substrate; a light emitting element located on the base substrate; a thin-film encapsulation layer located on the light emitting element; touch electrodes located on the thin-film encapsulation layer, each of the touch electrode including an opening; and a strain gauge including: resistance lines located in the openings, respectively, the resistance lines located in the same layer as the touch electrodes and having variable resistance values changed in response to a touch input; a first connection line connecting two resistance lines neighboring each other along a first direction; and a second connection line connecting two resistance lines neighboring each other along a second direction, the second direction intersecting the first direction, wherein the first connection line and the second connection line are located between the thin-film encapsulation layer and the resistance lines.

29 Claims, 44 Drawing Sheets

(52) U.S. Cl.
CPC ........ *G06F 3/0446* (2019.05); *G06F 3/04144* (2019.05); *G06F 3/04164* (2019.05); *G06F 2203/04105* (2013.01); *G06F 2203/04106* (2013.01); *G06F 2203/04113* (2013.01)

(58) Field of Classification Search
CPC ............. G06F 3/04144; G06F 3/04164; G06F 3/0446; G06F 2203/04105; G06F 2203/04106; G06F 2203/04113
See application file for complete search history.

(56) References Cited

U.S. PATENT DOCUMENTS

| | | | | |
|---|---|---|---|---|
| 2012/0218221 A1* | 8/2012 | Igeta | ........................ | G06F 3/045 345/174 |
| 2013/0009905 A1* | 1/2013 | Castillo | ................... | G06F 3/044 345/174 |
| 2013/0076646 A1* | 3/2013 | Krah | ........................ | G06F 3/047 345/173 |
| 2014/0020484 A1* | 1/2014 | Shaw | ................... | G06F 1/1632 73/862.625 |
| 2014/0062933 A1* | 3/2014 | Coulson | ................... | G06F 3/044 345/174 |
| 2014/0204285 A1* | 7/2014 | Jang | ........................ | G06F 3/0412 349/12 |
| 2016/0195955 A1* | 7/2016 | Picciotto | ............... | G06F 3/0414 345/174 |
| 2017/0010704 A1* | 1/2017 | Chen | ........................ | G06F 3/041 |
| 2017/0010719 A1 | 1/2017 | Chen et al. | | |
| 2017/0010730 A1* | 1/2017 | Chuang | ................... | G06F 3/0416 |
| 2017/0115781 A1* | 4/2017 | Zeng | ........................ | G06F 3/045 |
| 2017/0220180 A1 | 8/2017 | Lu et al. | | |
| 2017/0242518 A1* | 8/2017 | Liu | ........................ | G06F 3/044 |
| 2017/0285799 A1* | 10/2017 | Iuchi | ................... | G06F 3/0412 |
| 2017/0371471 A1 | 12/2017 | Kim et al. | | |
| 2018/0224984 A1 | 8/2018 | Kim et al. | | |
| 2019/0131354 A1* | 5/2019 | Lee | ........................ | G06F 3/0412 |
| 2019/0354241 A1 | 11/2019 | Kim et al. | | |

\* cited by examiner

TOUCH SENSOR AND DISPLAY DEVICE

CROSS REFERENCE TO RELATED APPLICATION

This application claims priority from and the benefit of Korean Patent Application No. 10-2018-0122358, filed on Oct. 15, 2018, which is hereby incorporated by reference for all purposes as if fully set forth herein.

BACKGROUND

Field

Exemplary embodiments of the invention relate generally to a touch sensor and a display device.

Discussion of the Background

Electronic devices that provide images to a user, such as a smartphone, a tablet PC, a digital camera, a notebook computer, a navigation system, and a smart television, include a display device for displaying images. The display device includes a display panel that generates and displays an image and various input devices.

Recently, a touch sensor that recognizes a touch input has been widely applied to display devices mainly in smartphones and tablet PCs. Due to the convenience of a touch method, the touch sensor is replacing an existing physical input device such as a keypad.

Regarding the touch sensor that detects a touch position, research has been recently made to apply a pressure sensor for detecting the intensity of pressure to a display device and utilize the pressure sensor in place of existing physical buttons.

The above information disclosed in this Background section is only for understanding of the background of the inventive concepts, and, therefore, it may contain information that does not constitute prior art.

SUMMARY

Devices constructed according to exemplary implementations of the invention provide a touch sensor capable of sensing pressure.

Additional features of the inventive concepts will be set forth in the description which follows, and in part will be apparent from the description, or may be learned by practice of the inventive concepts.

According to one or more embodiments of the invention, a touch sensor includes a base layer; first touch electrode members, each of the first touch electrode members including: first touch electrodes arranged on the base layer along a first direction and electrically connected to each other along the first direction; and first openings, each of the first touch electrodes including one of the first openings; second touch electrode members, each of the second touch electrode members including: second touch electrodes arranged on the base layer along a second direction and electrically connected to each other along the second direction, the second direction intersecting the first direction; and a strain gauge including rows of resistance lines arranged along the second direction, each of the rows of resistance lines including: resistance lines arranged in the first direction and electrically connected to each other along the first direction, wherein each of the first touch electrode members are arranged and spaced apart from each other along the second direction, wherein the resistance lines are located in the first openings, respectively, and wherein two neighboring rows of resistance lines are electrically connected to each other.

Each of the rows of resistance lines may include: the resistance lines all connected to each other in series.

A resistance line located at a distal end of a first row of resistance lines and a resistance line located at a distal end of a second row of resistance lines adjacent to the first row of resistance lines along the second direction may be electrically connected to each other.

The resistance line located at the distal end of the first row of resistance lines and the resistance line located at the distal end of the second row of resistance lines may be disposed in the same electrode column.

The first touch electrodes, the second touch electrodes and the resistance lines may be all located in a first layer and made of the same material.

The first touch electrode member may further include: a first connection portion connecting two of first touch electrodes neighboring each other along the first direction, wherein the second touch electrode member may further include: a second connection portion connecting two of second touch electrodes neighboring each other along the second direction, the second connection portion being insulated from the first connection portion, wherein the strain gauge may further include: a first connection line connecting two neighboring resistance lines in the same row of resistance lines; and a second connection line connecting two neighboring resistance lines located at respective distal ends of different rows of resistance lines neighboring each other along the second direction, wherein one of the first connection portion and the second connection portion is located in a second layer different from the first layer, wherein the other one of the first connection portion and the second connection portion is located in the first layer, and wherein the first connection line and the second connection line are located in the second layer.

The touch sensor may further include: an insulating layer located on the base layer, wherein the first connection line and the second connection line may be located on the base layer, wherein the insulating layer is located on the first connection line, wherein the first touch electrodes, the second touch electrodes and the resistance lines may be located on the insulating layer, and wherein the insulating layer may be located between the resistance lines and the first connection line.

The touch sensor may further include: a plurality of branches located in each of the first openings and connected to each of the resistance lines, spaced apart from each other, wherein the branches may be made of the same material as the resistance lines.

The touch sensor may further include: a controller connected to the first touch electrode member, the second touch electrode member and the strain gauge, wherein the controller may be configured to: detect a position of a touch input based on a change in capacitance between a first touch electrode and a second touch electrode caused by the touch input; and detect the pressure of the touch input based on a change in a resistance value of the strain gauge caused by the touch input.

The controller may include: a Wheatstone bridge circuit which is electrically connected to the strain gauge.

The touch sensor may further include: a first signal line electrically connecting a first end of the strain gauge and the Wheatstone bridge circuit; and a second signal line electrically connecting a second end of the strain gauge and the Wheatstone bridge circuit, wherein a sensing area in which the first touch electrodes, the second touch electrodes and the resistance lines may be located and a peripheral area which is located around the sensing area are defined in the base layer, and wherein the first signal line and the second signal line may be located in the peripheral area and are all located on a side of the sensing area.

The Wheatstone bridge circuit may include: a first node configured to receive a driving voltage and electrically connected to a first end of the strain gauge; a second node configured to receive a reference voltage; a first output node which is electrically connected to a second end of the strain gauge; a second output node; a first resistor connected between the second node and the second output node; a second resistor connected between the first node and the second output node; and a third resistor connected between the second node and the first output node.

The resistance value of the strain gauge, a resistance value of the first resistor, a resistance value of the second resistor, and a resistance value of the third resistor may be substantially equal when a touch input is not applied.

The touch sensor may further include: a plurality of dummy electrodes located on the base layer, wherein each of the second touch electrodes may include a second opening, wherein the first touch electrodes, the second touch electrodes, and the resistance lines may be all located in a first layer, wherein the dummy electrodes may be located in the second openings, spaced apart from the second touch electrodes and are located in the first layer, and wherein the first touch electrodes, the second touch electrodes, the resistance lines, and the dummy electrodes may be made of the same material.

An area of each of the second openings may be larger than that of each of the first openings.

The second touch electrodes may be driving electrodes, and the first touch electrodes are sensing electrodes.

According to one or more embodiments of the invention, a touch sensor includes a base layer; first touch electrode members, each of the first touch electrode members including: first touch electrodes arranged on the base layer along a first direction and electrically connected to each other along the first direction; second touch electrode members, each of the second touch electrode members including: second touch electrodes arranged on the base layer along a second direction intersecting the first direction and electrically connected to each other along the second direction; and first openings, each of the second touch electrodes including one of the first openings; and a strain gauge including rows of resistance lines arranged along the second direction, each of the rows of resistance lines including: resistance lines arranged in the first direction and electrically connected to each other along the first direction, wherein each of the second touch electrode members are arranged and spaced apart from each other along the first direction, wherein the resistance lines are located in the first openings, respectively, and wherein two neighboring rows of resistance lines are electrically connected to each other.

Each of the rows of resistance lines may include: the resistance lines all connected to each other in series.

A resistance line located at a distal end of a first row of resistance lines and a resistance line located at a distal end of a second row of resistance lines adjacent to the first row of resistance lines along the second direction are electrically connected to each other.

The first touch electrode member further includes: a first connection portion connecting two of first touch electrodes neighboring each other along the first direction, wherein the second touch electrode member further includes: a second connection portion connecting two of second touch electrodes neighboring each other along the second direction, the second connecting portion being insulated from the first connection portion, wherein the first touch electrodes and the second touch electrodes are all located in a first layer, wherein one of the first connection portion and the second connection portion is located in a second layer different from the first layer, wherein the other one of the first connection portion and the second connection portion is located in the first layer, and wherein the resistance lines are located in the first layer or the second layer.

The resistance lines may be located in the first layer, and the first touch electrodes, and wherein the second touch electrodes and the resistance lines may be made of the same material.

The strain gauge may further include: a first connection line connecting resistance lines located in the same row of resistance lines; and a second connection line connecting two neighboring resistance lines located in different rows of resistance lines neighboring each other along the second direction, and the first connection line and the second connection line may be located in a different layer from the resistance lines.

The touch sensor may further include a plurality of dummy electrodes located on the base layer, wherein each of the first touch electrodes may include a second opening, wherein the first touch electrodes, the second touch electrodes, and the resistance lines may be all located in a first layer, wherein the dummy electrodes may be located in the second openings, spaced apart from the first touch electrodes and are located in the first layer, and wherein the first touch electrodes, the second touch electrodes, the resistance lines, and the dummy electrodes may be made of the same material.

According to one or more embodiments of the invention, a touch sensor includes a base layer; first touch electrode members, each of the first touch electrode members including: first touch electrodes arranged on the base layer along a first direction and electrically connected to each other along the first direction; first openings, each of the first touch electrodes including one of the first openings; second touch electrode members, each of the second touch electrode members including: second touch electrodes arranged on the base layer along a second direction intersecting the first direction and electrically connected to each other along the second direction; second openings, each of the second touch electrodes including one of the second openings; and a strain gauge including: rows of first resistance lines arranged along the second direction, each of the rows of resistance lines including: resistance lines arranged in the first direction and electrically connected to each other along the first direction; and rows of second resistance lines arranged along the second direction, each of the rows of resistance lines including: resistance lines arranged in the first direction and electrically connected to each other along the first direction, wherein each of the first touch electrode members arranged and are spaced apart from each other along the second direction, wherein each of the second touch electrode members arranged and are spaced apart from each other along the first direction, wherein the first resistance lines are located in the first openings and spaced apart from the first touch electrodes, respectively, and the second resistance lines are located in the second openings and spaced apart from the second touch electrodes, respectively, and wherein one of the first resistance lines and one of the second resistance lines neighbor each other along the second direction are electrically connected to each other.

The first touch electrodes, the second touch electrodes, the first resistance lines, and the second resistance lines may be located in the same layer and made of the same material.

A length of each of the second resistance lines may be different from that of each of the first resistance lines.

An area of each of the second openings may be larger than that of each of the first openings, and the length of each of the second resistance lines may be greater than that of each of the first resistance lines.

The strain gauge may further include: a connection line connecting a first resistance line located at a distal end of a row of first resistance line and a second resistance line located at a distal end of a row of second resistance line adjacent to the row of first resistance line along the second direction, wherein the connection line may be located in a different layer from the first touch electrodes and the second touch electrodes.

According to one or more embodiments of the invention, a display device includes: a base substrate; a light emitting element located on the base substrate; a thin-film encapsulation layer located on the light emitting element; touch electrodes located on the thin-film encapsulation layer, each of the touch electrode including an opening; and a strain gauge including: resistance lines located in the openings, respectively, the resistance lines located in the same layer as the touch electrodes and having variable resistance values changed in response to a touch input; a first connection line connecting two resistance lines neighboring each other along a first direction; and a second connection line connecting two resistance lines neighboring each other along a second direction, the second direction intersecting the first direction, wherein the first connection line and the second connection line are located between the thin-film encapsulation layer and the resistance lines.

The thin-film encapsulation layer may include: a first encapsulating inorganic layer located on the light emitting element; an encapsulating organic layer located on the first encapsulating inorganic layer; and a second encapsulating inorganic layer located on the encapsulating organic layer, wherein the touch electrodes and the strain gauge may be located on the second encapsulating inorganic layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
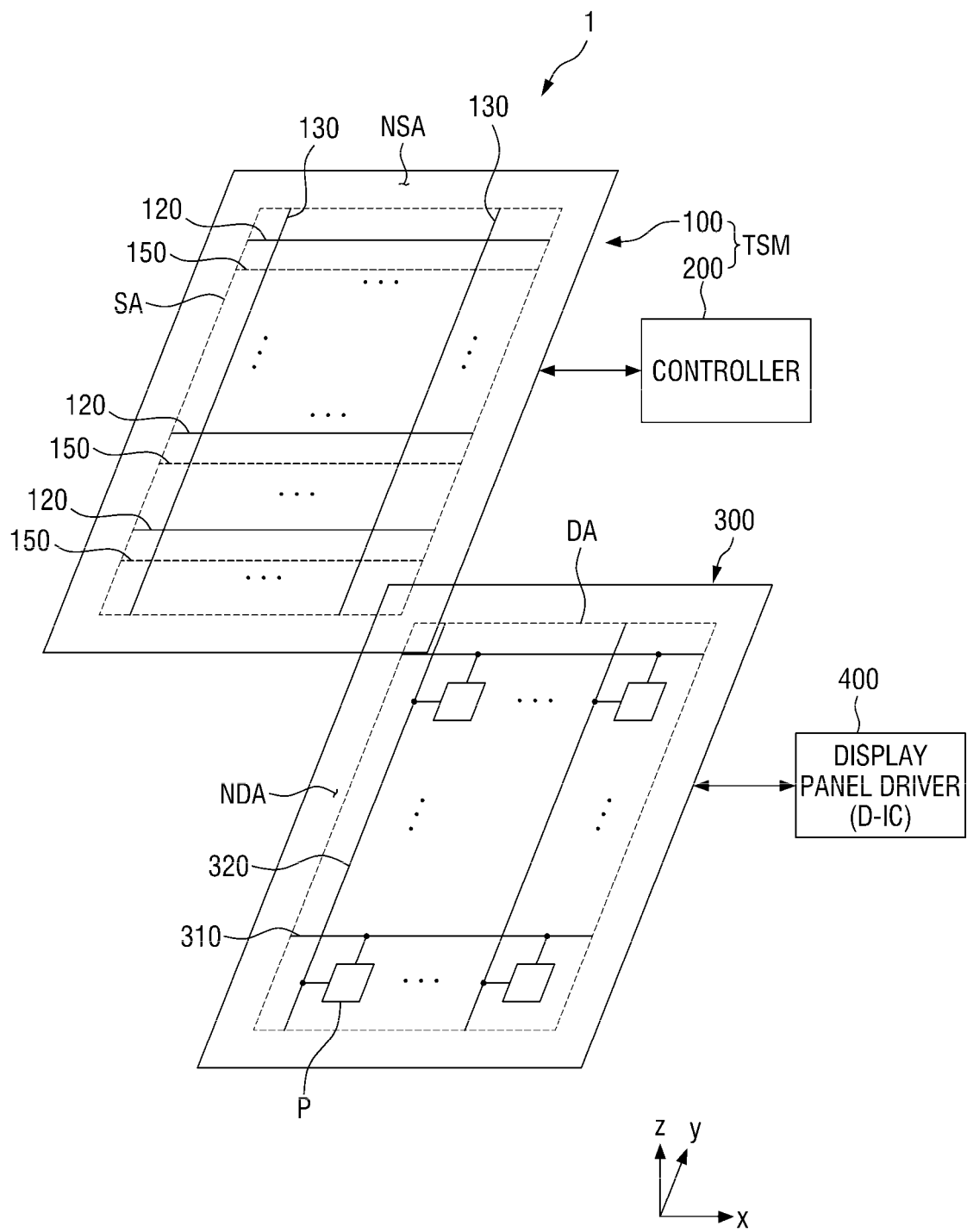
FIG. 1 is a schematic diagram of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described with reference to the accompanying drawings.

Figure 2:
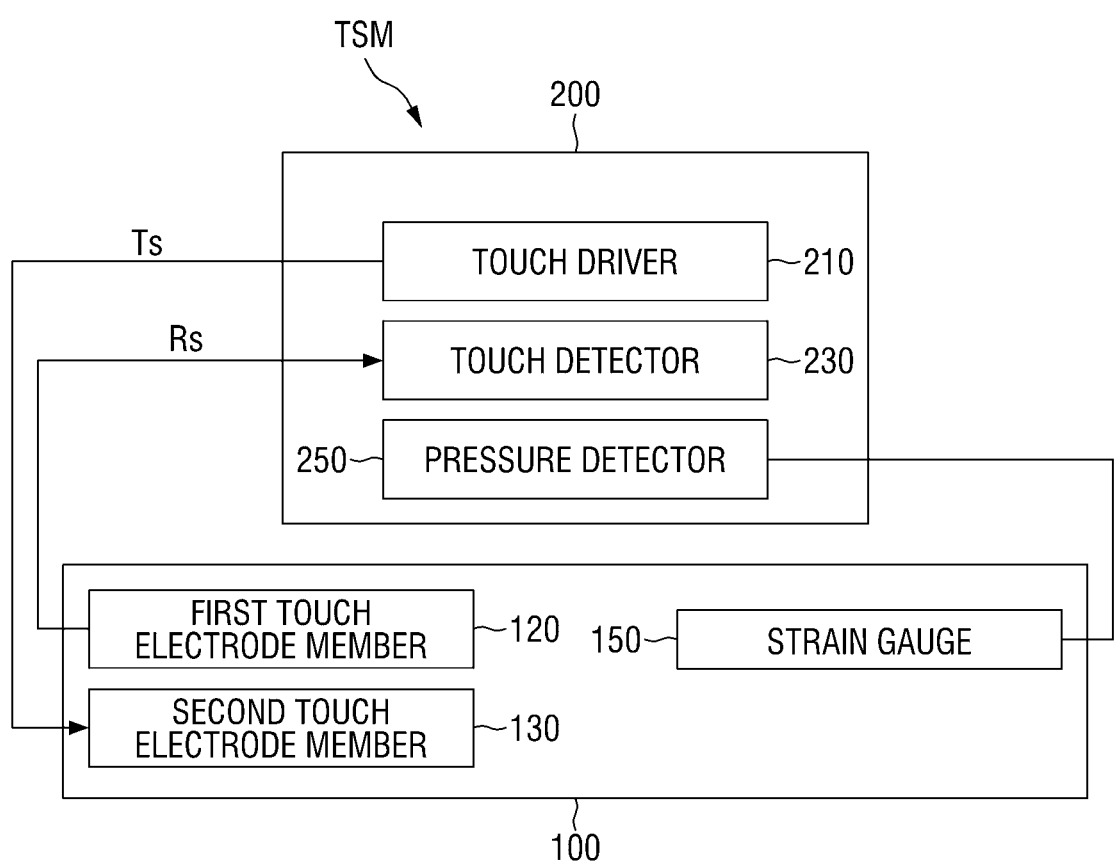
FIG. 2 is a block diagram of a touch sensor illustrated in FIG. 1.

FIG. 1 is a schematic diagram of a display device 1 according to an exemplary embodiment, and FIG. 2 is a block diagram of a touch sensor TSM illustrated in FIG. 1.

Referring to FIGS. 1 and 2, the display device 1 according to the exemplary embodiment includes the touch sensor TSM and a display panel 300 and may further include a display panel driver 400. The touch sensor TSM includes a sensor unit 100 and a controller 200.

In the exemplary embodiment of FIG. 1, the sensor unit 100 and the display panel 300 are separated from each other. However, this is just for ease of description, and the sensor unit 100 and the display panel 300 may also be formed integrally with each other.

The display panel 300 includes a display area DA and a non-display area NDA surrounding at least one side of the display area DA. The display area DA includes a plurality of scan lines 310 and a plurality of data lines 320, and a plurality of pixels P connected to the scan lines 310 and the data lines 320. The non-display area NDA may include various driving signals for driving the pixels P and/or wirings for supplying driving power.

In the present disclosure, the type of the display panel 300 is not particularly limited. For example, the display panel 300 may be a self-luminous display panel such as an organic light emitting display panel, a quantum dot light emitting display (QLED) panel, a micro-light emitting diode (LED) display panel, a nano-LED display panel. Alternatively, the display panel 300 may be a non-luminous display panel such as a liquid crystal display (LCD) panel, an electrophoretic display (EPD) panel, or an electrowetting display (EWD) panel. If the display panel 300 is a non-luminous display panel, the display device 1 may further include a backlight unit for supplying light to the display panel 300. For ease of description, a case where the display panel 300 is an organic light emitting display panel will be described below as an example.

The display panel driver 400 is electrically connected to the display panel 300 to supply signals necessary for driving the display panel 300. For example, the display panel driver 400 may include at least one of a scan driver for supplying scan signals to the scan lines 310, a data driver for supplying data signals to the data lines 320, and a timing controller for driving the scan driver and the data driver. According to an exemplary embodiment, the scan driver, the data driver, and/or the timing controller may be integrated into one display integrated circuit (D-IC). Alternatively, in an exemplary embodiment, at least one of the scan driver, the data driver, and the timing controller may be integrated or mounted on the display panel 300.

The sensor unit 100 may be provided on at least one area of the display panel 300. For example, the sensor unit 100 may be provided on at least one surface of the display panel 300 to overlap the display panel 300. For example, the sensor unit 100 may be disposed on a surface (e.g., an upper surface) of the display panel 300 in a direction in which an image is emitted, among both surfaces of the display panel 300. Alternatively, the sensor unit 100 may be formed directly on at least one of both surfaces of the display panel 300 or may be formed inside the display panel 300. For example, the sensor unit 100 may be formed directly on an outer surface of an upper substrate (or a thin-film encapsulation layer) or a lower substrate (e.g., an upper surface of the upper substrate or a lower surface of the lower substrate) of the display panel 300 or may be formed directly on an inner surface of the upper substrate or the lower substrate (e.g., a lower surface of the upper substrate or an upper surface of the lower substrate).

The sensor unit 100 includes a sensing area SA and a peripheral area NSA surrounding at least a part of the sensing area SA. In some exemplary embodiments, the sensing area SA may be an area of the sensor unit 100 which senses a touch input, and the peripheral area NSA may be an area of the sensor unit 100 which cannot sense a touch input. According to an exemplary embodiment, the sensing area SA may be disposed to correspond to the display area DA of the display panel 300, and the peripheral area NSA may be disposed to correspond to the non-display area NDA of the display panel 300. For example, the sensing area SA of the sensor unit 100 may overlap the display area DA of the display panel 300, and the peripheral area NSA of the sensor unit 100 may overlap the non-display area NDA of the display panel 300.

A plurality of first touch electrode members 120 for detecting a touch input and a plurality of second touch electrode members 130 for detecting a touch input may be provided in the sensing area SA of the sensor unit 100.

The first touch electrode members 120 may extend along a first direction X and may be spaced apart from each other along a second direction Y intersecting the first direction X. That is, the first touch electrode members 120 extending in the first direction X may be spaced apart from each other along the second direction Y to form electrode rows.

The second touch electrode members 130 may extend along the second direction Y and may be spaced apart from each other along the first direction X. The second touch electrode members 130 may be spaced apart from the first touch electrode members 120 and may be insulated from the first touch electrode members 120. That is, the second touch electrode members 130 extending in the second direction Y may be separated from each other along the first direction X to form columns.

Figure 3:
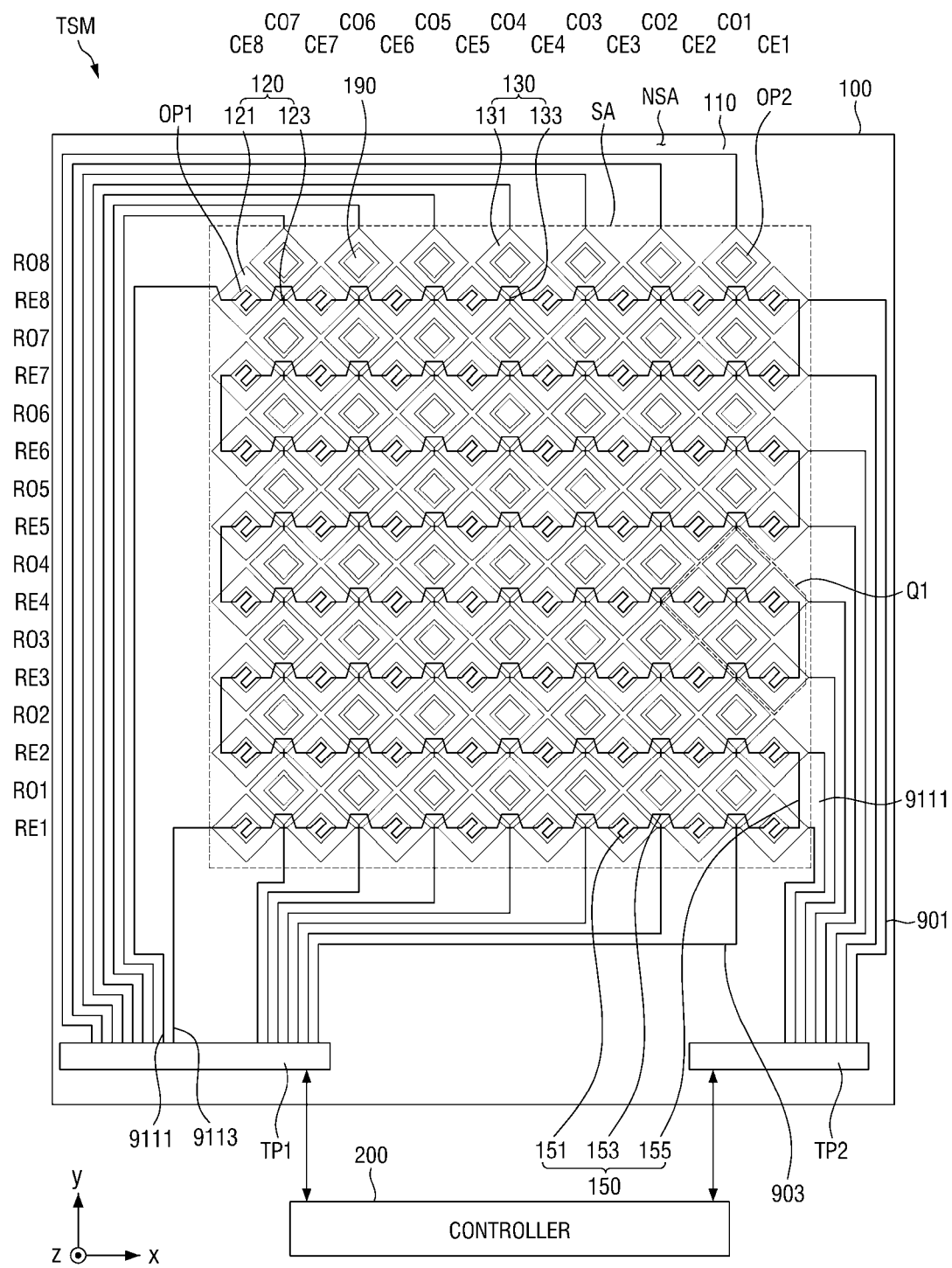
FIG. 3 illustrates the touch sensor of FIG. 1, a plan view of a sensor unit of the touch sensor, and the connection relationship between the sensor unit and a controller.

The shapes, sizes, and/or arrangement directions of the first touch electrode members 120 and the second touch electrode members 130 are not particularly limited. As a non-limiting embodiment, the first touch electrode members 120 and the second touch electrode members 130 may be configured as illustrated in FIG. 3, which will be described later.

The first touch electrode members 120 and the second touch electrode members 130 may be electrically connected to the controller 200. In some exemplary embodiments, each of the second touch electrode members 130 may be a driving electrode member that receives a driving signal Ts for touch detection from the controller 200, and each of the first touch electrode members 120 may be a sensing electrode member that outputs a sensing signal Rs for touch detection to the controller 200.

The first touch electrode members 120 and the second touch electrode members 130 may overlap at least one electrode of the display panel 300. For example, when the display panel 300 is an organic light emitting display panel, the first touch electrode members 120 and the second touch electrode members 130 may overlap a cathode of the display panel 300.

A strain gauge 150 may be provided in the sensing area SA of the sensor unit 100 to detect touch pressure. When an external force is applied, the length or cross-sectional area of the strain gauge 150 may be changed, causing a change in resistance value. The strain gauge 150 may be spaced apart from the first touch electrode members 120 and the second touch electrode members 130 and may be insulated from the first touch electrode members 120 and the second touch electrode members 130.

In some exemplary embodiments, at least a portion of the strain gauge 150 may extend along the first direction X, like the first touch electrode members 120.

The controller 200 may be electrically connected to the sensor unit 100 to supply the driving signal Ts to the sensor unit 100 and may detect a touch position by receiving the sensing signal Rs corresponding to the driving signal Ts from the sensor unit 100. In addition, the controller 200 may be electrically connected to the strain gauge 150 to detect touch pressure.

In some exemplary embodiments, the controller 200 may include a touch driver 210, a touch detector 230, and a pressure detector 250.

The touch driver 210 may provide the driving signal Ts for detecting a touch input to each of the second touch electrode members 130.

The touch detector 230 may detect the presence or absence of a touch input and/or the position of the touch input by receiving the sensing signal Rs corresponding to the driving signal Ts from each of the first touch electrode members 120. In some exemplary embodiments, the sensing signal Rs may be a change in mutual capacitance between a first touch electrode member 120 and a second touch electrode member 130. More specifically, when a touch input occurs, the mutual capacitance is changed at the position of the touch input or around the position of the touch input. The touch detector 230 may receive a change in mutual capacitance between each first touch electrode member 120 and each second touch electrode member 130 as the sensing signal Rs and detect the presence or absence and/or position of a touch input by using the sensing signal Rs.

In some exemplary embodiments, the touch detector 230 may include at least one amplifier 231 for amplifying a received sensing signal Rs, an analog-digital converter (ADC) 233 connected to an output terminal 231c of the amplifier 231, and a processor 235. This will be described in more detail later with reference to FIG. 20.

The pressure detector 250 may be electrically connected to the strain gauge 150 and may detect touch pressure based on a change in the resistance value of the strain gauge 150. In some exemplary embodiments, the pressure detector 250 may include a Wheatstone bridge circuit that is electrically connected to the strain gauge 150.

In some exemplary embodiments, the touch driver 210, the touch detector 230, and the pressure detector 250 may be integrated into one touch IC.

In some exemplary embodiments, the touch driver 210 and the touch detector 230 may be integrated into one touch IC, and the pressure detector 250 may be located in a portion other than the inside of the touch IC. For example, the pressure detector 250 may be disposed on the display panel 300 or on a separate flexible circuit board.

The touch sensor TSM will now be described in more detail by additionally referring to FIGS. 3 through 14.

Figure 4:
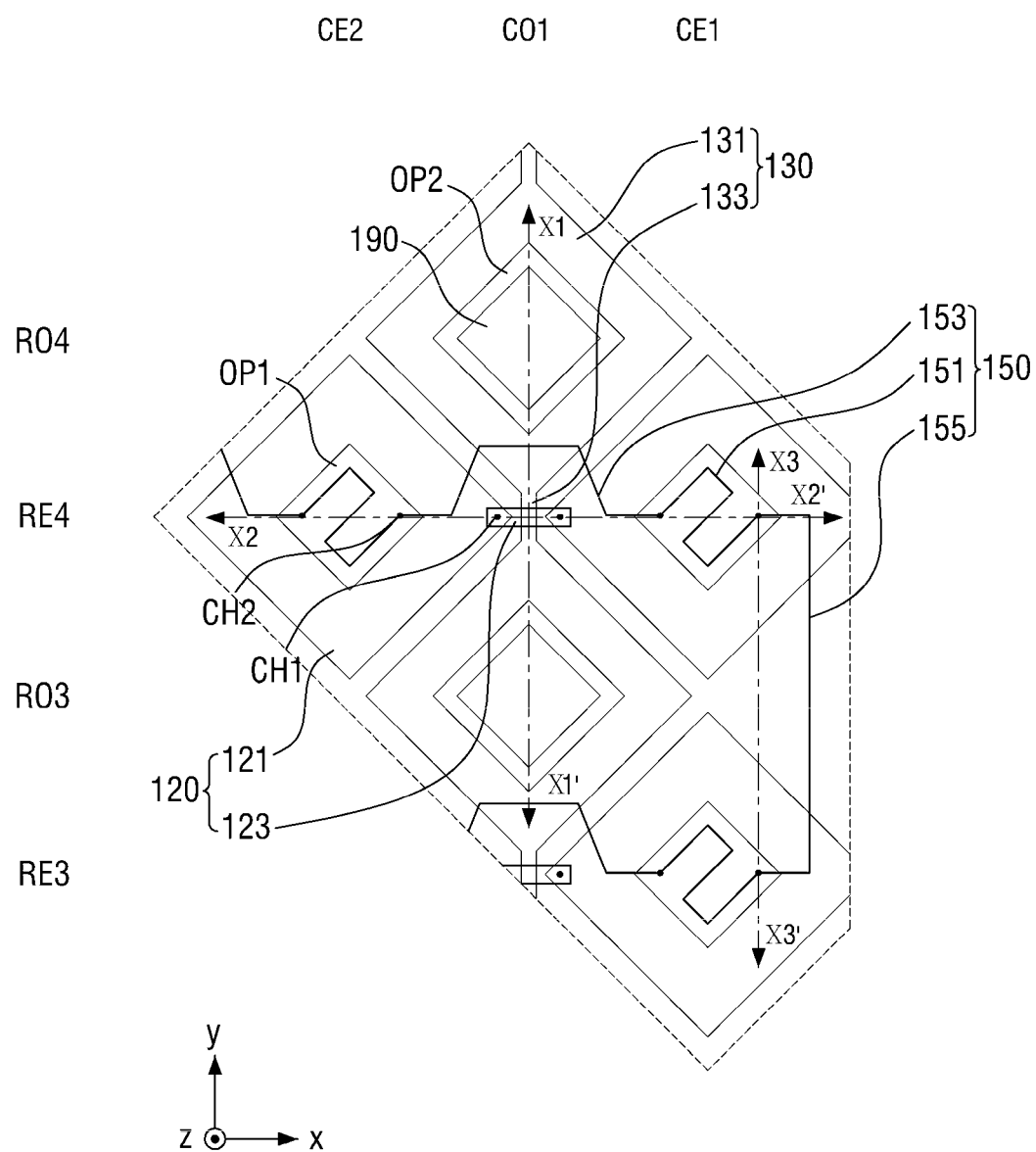
FIG. 4 is an enlarged plan view of a portion Q1 of FIG. 3.
Figure 5:
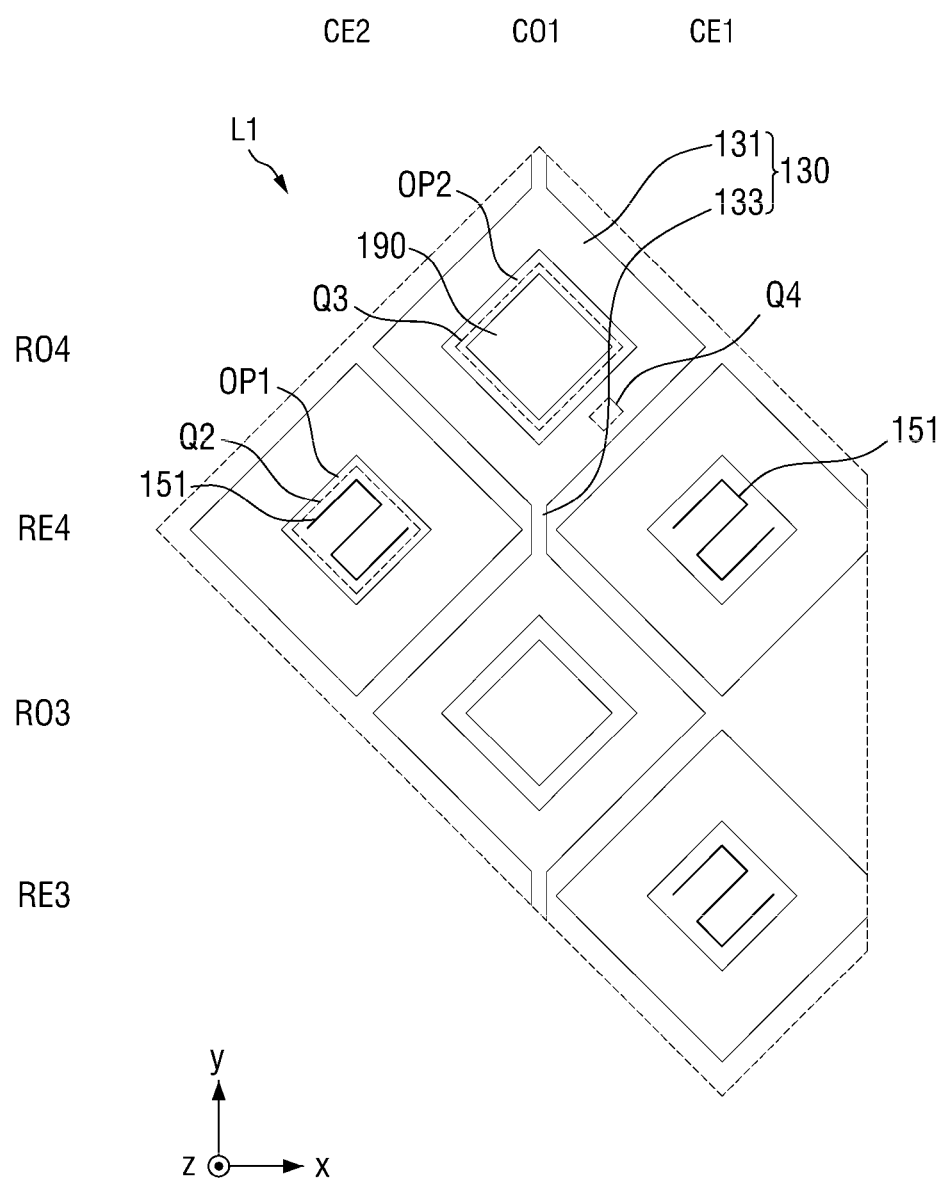
FIG. 5 illustrates the structure of a first layer of the sensor unit of FIG. 4.
Figure 6:
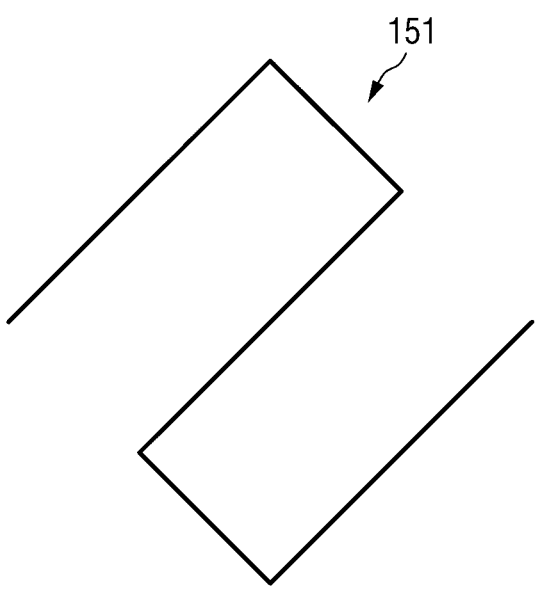
FIG. 6 is an enlarged plan view of a portion Q2 of FIG. 5 including a resistance line.
Figure 6:
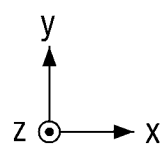
Figure 7:
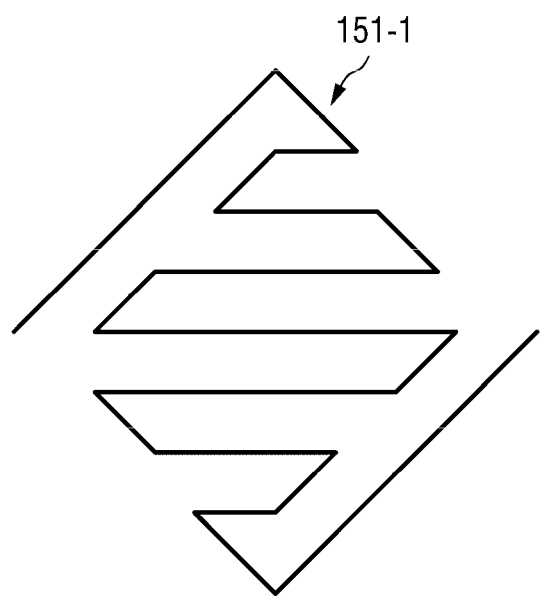
FIGS. 7 and 8 illustrate modified examples of the resistance line of FIG. 6.
Figure 8:
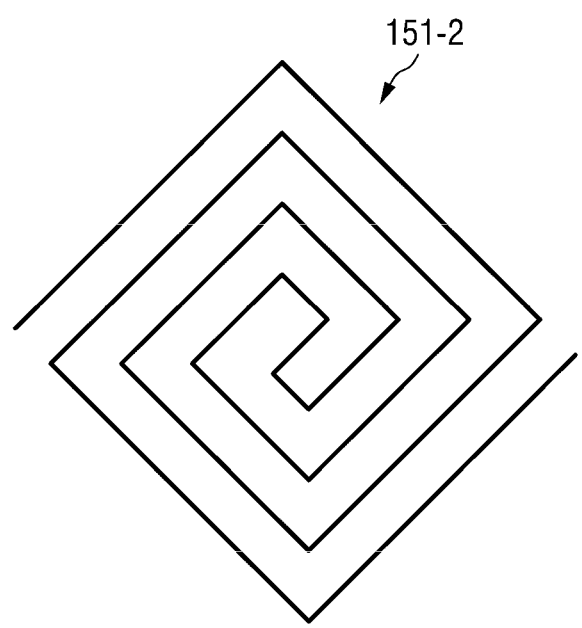
Figure 9:
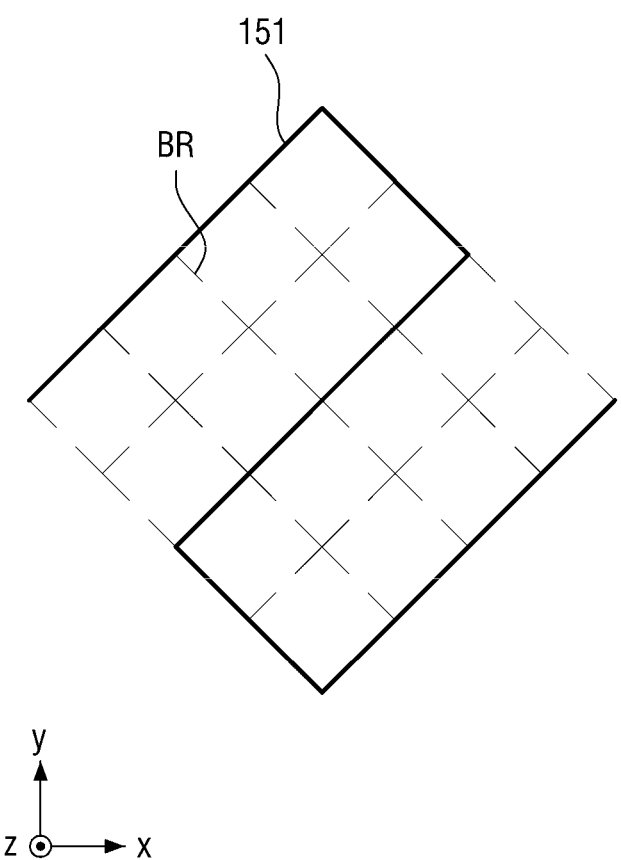
FIG. 9 illustrates a modified example of the structure of the resistance line of FIG. 6.
Figure 10:
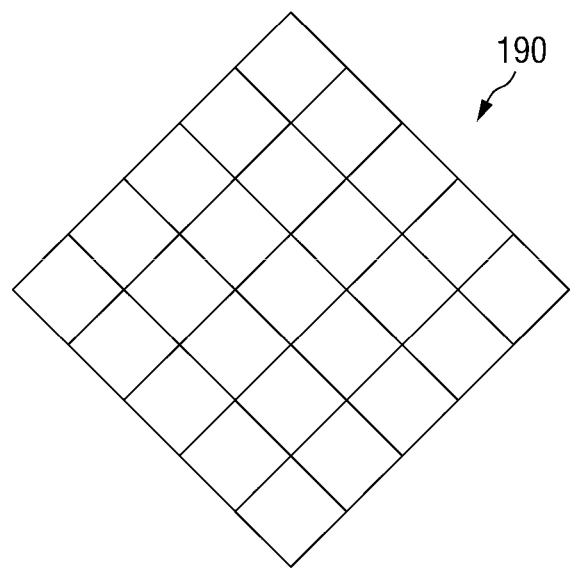
FIG. 10 is an enlarged plan view of a portion Q3 of FIG. 5.
Figure 11:
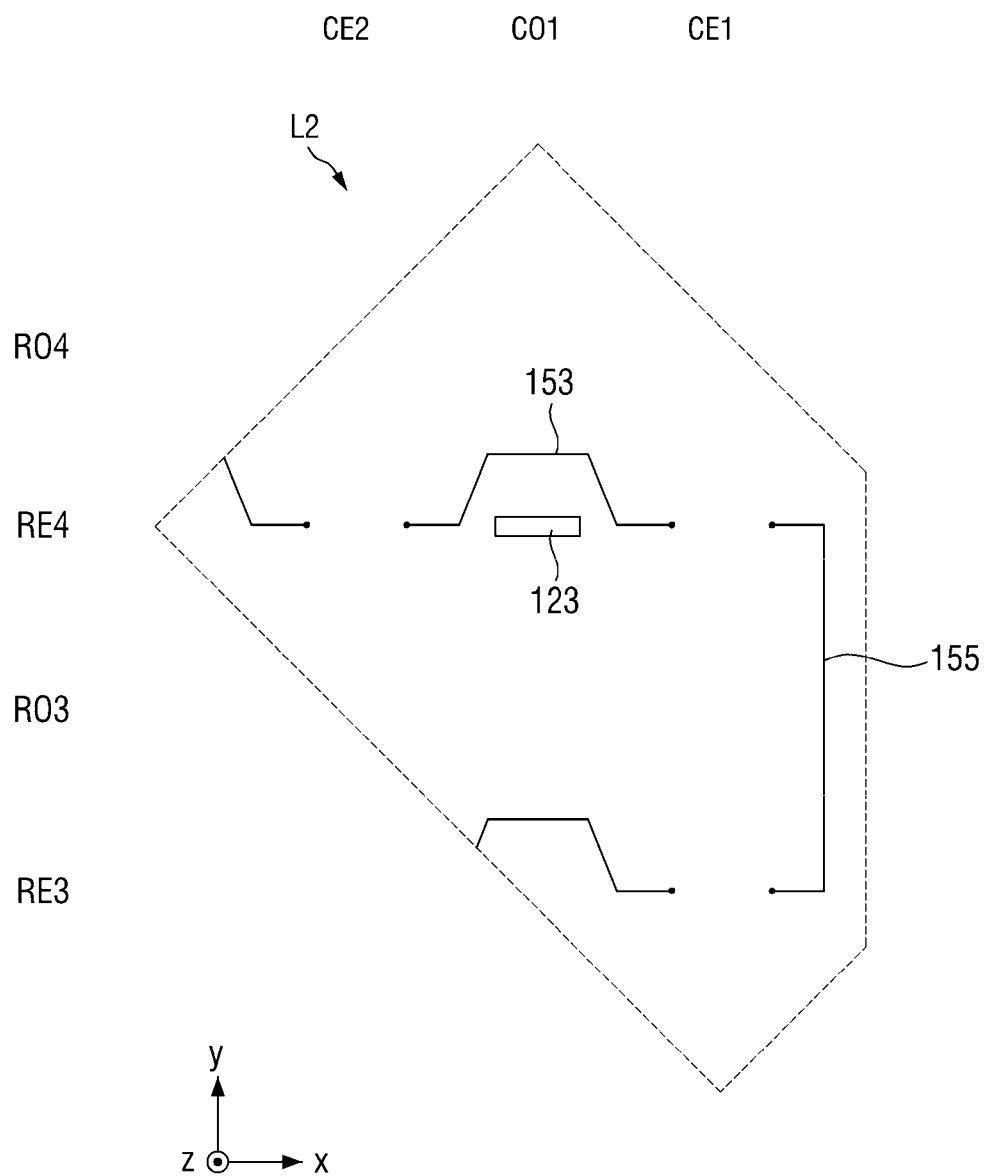
FIG. 11 illustrates the structure of a second layer of the sensor unit of FIG. 4.
Figure 12:
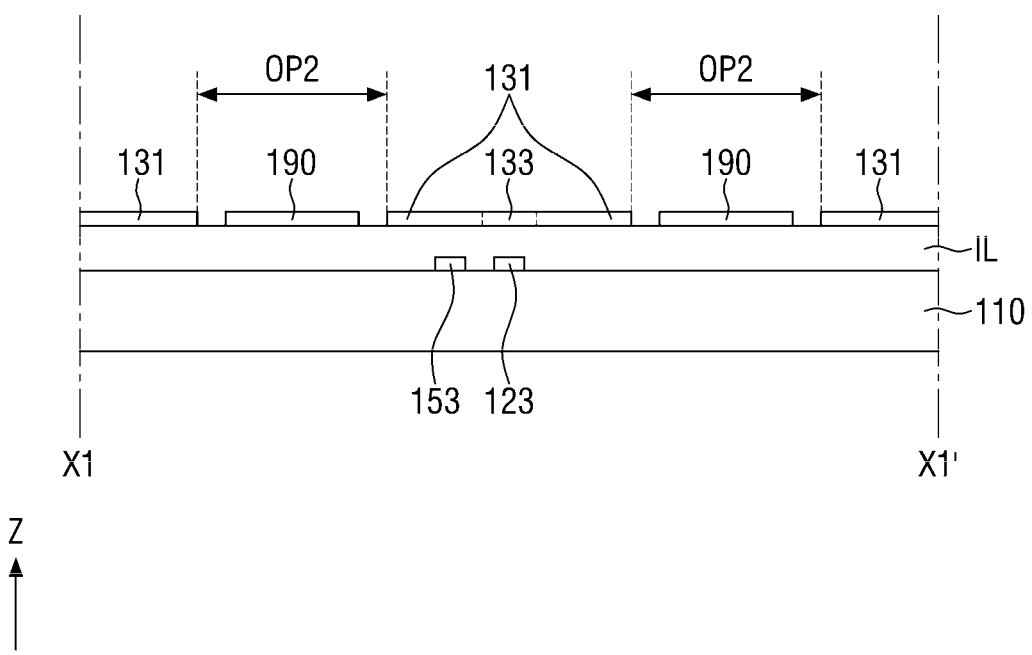
FIG. 12 is a cross-sectional view taken along a sectional line X1-X1' of FIG. 4.
Figure 13:
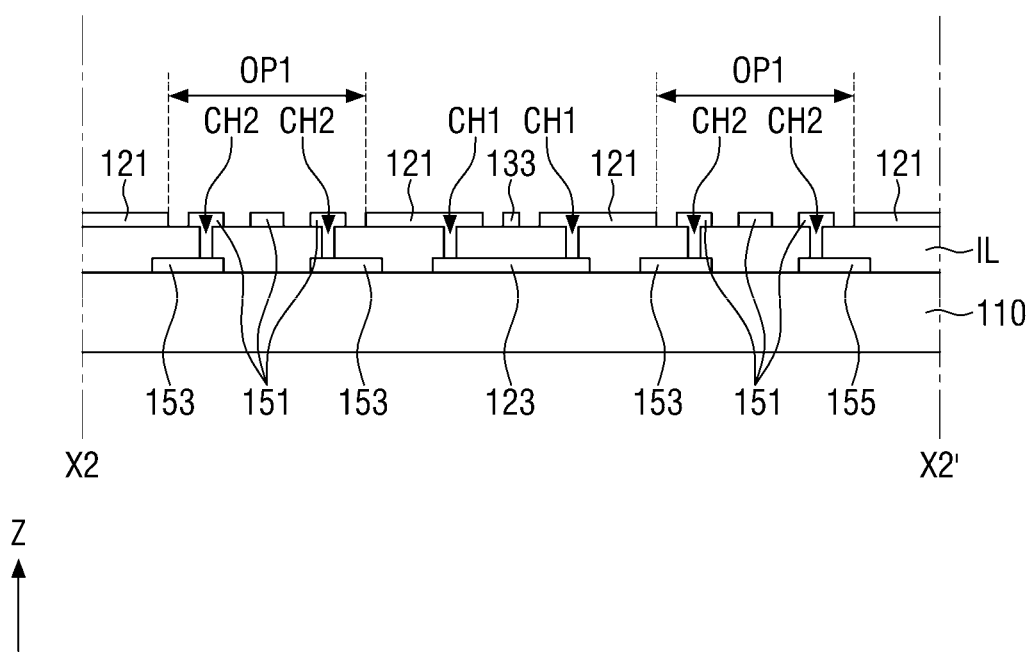
FIG. 13 is a cross-sectional view taken along a sectional line X2-X2' of FIG. 4.
Figure 14:
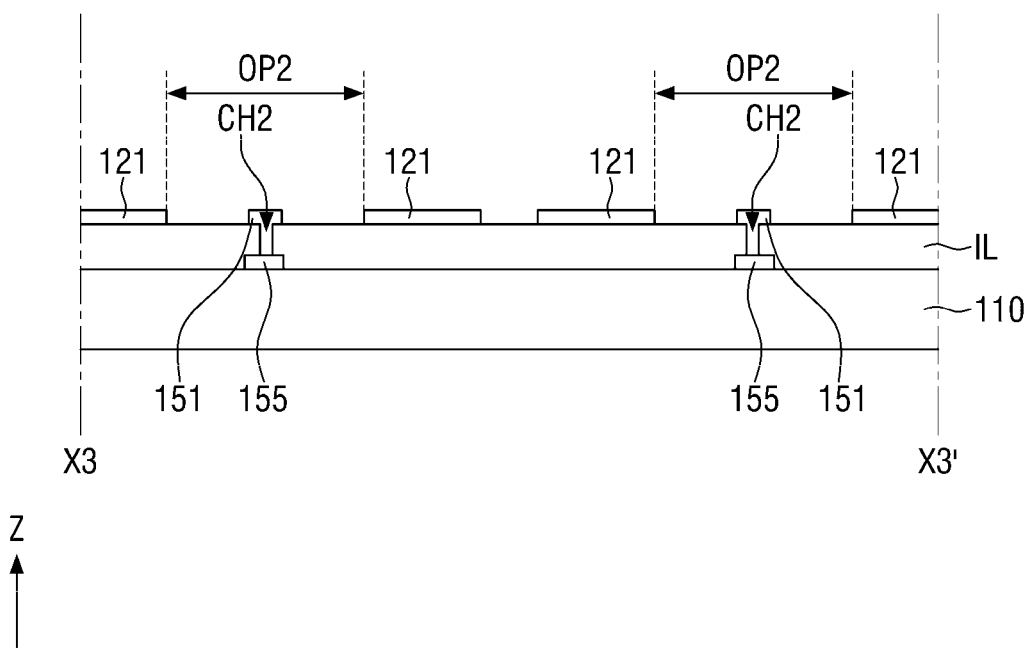
FIG. 14 is a cross-sectional view taken along a sectional line X3-X3' of FIG. 4.

FIG. 3 illustrates the touch sensor TSM of FIG. 1, a plan view of the sensor unit 100 of the touch sensor TSM, and the connection relationship between the sensor unit 100 and the controller 200. FIG. 4 is an enlarged plan view of a portion Q1 of FIG. 3. FIG. 5 illustrates the structure of a first layer L1 of the sensor unit 100 of FIG. 4. FIG. 6 is an enlarged plan view of a portion Q2 of FIG. 5 including a resistance line. FIGS. 7 and 8 illustrate modified examples of the resistance line 151 of FIG. 6. FIG. 9 illustrates a modified example of the structure of the resistance line FIG. 6. FIG. 10 is an enlarged plan view of a portion Q3 of FIG. 5. FIG. 11 illustrates the structure of a second layer L2 of the sensor unit 100 of FIG. 4. FIG. 12 is a cross-sectional view taken along a sectional line X1-X1' of FIG. 4. FIG. 13 is a cross-sectional view taken along a sectional line X2-X2' of FIG. 4. FIG. 14 is a cross-sectional view taken along a sectional line X3-X3' of FIG. 4.

Referring to FIGS. 3 through 14, the sensor unit 100 includes a base layer 110, the first touch electrode members 120, the second touch electrode members 130 and the strain gauge 150 and may further include dummy electrodes 190.

The base layer 110 may include the sensing area SA and the peripheral area NSA. The base layer 110 may be a layer serving as a base of the sensor unit 100. In some exemplary embodiments, the base layer 110 may be one of the layers constituting the display panel 300. In an exemplary embodiment in which the sensor unit 100 and the display panel 300 are formed integrally with each other, the base layer 110 may be at least one of the layers constituting the display panel 300. For example, the base layer 110 may include a thin-film encapsulation layer of the display panel 300. Alternatively, according to an exemplary embodiment, the base layer 110 may be a rigid substrate or a flexible substrate. For example, the base layer 110 may be a rigid substrate made of glass or tempered glass or a flexible substrate made of a thin film of a flexible plastic material. A case where the base layer 110 is a layer including at least one (e.g., the thin-film encapsulation layer) of the layers constituting the display panel 300 will be described below as an example.

The first touch electrode members 120, the second touch electrode members 130 insulated from the first touch electrode member 120, and the strain gauge 150 insulated from the first touch electrode members 120 and the second touch electrode members 130 may be located on the sensing area SA of the base layer 110.

The first touch electrode members 120 may extend along the first direction X and may be spaced apart from each other along the second direction Y as described above. Each of the first touch electrode members 120 spaced apart from each other along the second direction Y may form an electrode row. In FIG. 3, eight of the first touch electrode members 120 are disposed along the second direction Y to respectively form a first electrode row RE1, a second electrode row RE2, a third electrode row RE3, a fourth electrode row RE4, a fifth electrode row RE5, a sixth electrode row RE6, a seventh electrode row RE7, and an eighth electrode row RE8 arranged sequentially along the second direction Y. However, the present disclosure is not limited to this case, and the number of the first touch electrode members 120 can be variously changed.

Each of the first touch electrode members 120 may include a plurality of first touch electrodes 121 arranged along the first direction X and a plurality of first connection portions 123, each connecting the first touch electrodes 121 neighboring each other along the first direction X. In the following description of embodiments, the term "connection" may encompass "connection" in physical and/or electrical aspects.

In some exemplary embodiments, the first touch electrodes 121 may be located in the first layer L1. The first touch electrodes 121 may have a rhombic planar shape. However, the planar shape of the first touch electrodes 121 is not limited to the rhombic shape and can be changed to various shapes such as a triangle, a quadrilateral other than a rhombus, a pentagon, a circle, and a bar.

The first touch electrodes 121 may include a conductive material. Examples of the conductive material may include metals and alloys of the metals. Examples of the metals may include gold (Au), silver (Ag), aluminum (Al), molybdenum (Mo), chromium (Cr), titanium (Ti), nickel (Ni), neodymium (Nd), copper (Cu), and platinum (Pt). The first touch electrodes 121 may also be made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube, and graphene.

In some exemplary embodiments, the first touch electrodes 121 may have a single-layer structure or a multilayer structure. When the first touch electrodes 121 have a multilayer structure, they may include multiple metal layers. For example, the first touch electrodes 121 may have a three-layer structure of Ti/Al/Ti.

In some exemplary embodiments, the first touch electrodes 121 may have a mesh structure so as not to be visible to a user. When the first touch electrodes 121 have a mesh structure, they may be arranged to not overlap light emitting areas of the display panel 300. In other words, mesh hole overlapping a light emitting area, may be defined in each of the first touch electrodes 121 having the mesh structure.

In some exemplary embodiments, the first touch electrodes 121 spaced apart from each other along the second direction Y may form electrode columns. In FIG. 3, eight of the first touch electrodes 121 are disposed in one column, and the first touch electrodes 121 arranged along the second direction Y form a first electrode column CE1, a second electrode column CE2, a third electrode column CE3, a fourth electrode column CE4, a fifth electrode column CE5, a sixth electrode column CE6, a seventh electrode column CE7, and an eighth electrode column CE8. However, the present disclosure is not limited to this case, and the number of electrode columns formed by the first touch electrodes 121 can be variously changed.

Each of the first touch electrodes 121 may include a first opening OP1. For example, at least a central portion of each of the first touch electrodes 121 may be open to expose a layer located under the first touch electrode 121. For example, when an insulating layer IL is located under the first touch electrodes 121, a portion of the insulating layer IL may be exposed through each of the first openings OP1.

Each of the first connection portions 123 may electrically connect the first touch electrodes 121 neighboring each other along the first direction X and may contact the first touch electrodes 121. In some exemplary embodiments, each of the first connection portions 123 may be configured as a bridge-shaped connection pattern. In some exemplary embodiments, the first connection portions 123 may be located in the second layer L2 different from the first layer L1 in which the first touch electrodes 121 are located.

In some exemplary embodiments, the insulating layer IL may be located between the first touch electrodes 121 and the first connection portions 123. In some exemplary embodiments, the first connection portions 123 located in the second layer L2 may be located on the base layer 110, the insulating layer IL may be located on the first connection portions 123, and the first touch electrodes 121 located in the first layer L1 may be located on the insulating layer IL. The first connection portions 123 and the first touch electrodes 121 may be connected to and directly contact each other through first contact holes CH1 formed in the insulating layer IL.

The insulating layer IL may include an insulating material. In some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least any one of acrylic resin, methacrylic resin, polyisoprene, vinyl resin, epoxy resin, urethane resin, cellulose resin, siloxane resin, polyimide resin, polyamide resin, and perylene resin.

The first connection portions 123 may include a conductive material. In some exemplary embodiments, the first connection portions 123 may include the same material as the first touch electrodes 121 or may include one or more materials selected from the materials exemplified as the constituent material of the first touch electrodes 121. In some exemplary embodiments, the first connection portions 123 may have a single-layer structure or a multilayer structure. For example, the first connection portions 123 may have a three-layer structure of Ti/Al/Ti. Alternatively, the first connection portions 123 may be made of a different material from the first touch electrodes 121.

In the drawings, one first connection portion 123 is disposed between first touch electrodes 121 neighboring each other along the first direction X. However, the number of the first connection portions 123 can be variously changed. For example, two or more first connection portions 123 may be disposed between two of first touch electrodes 121 neighboring each other along the first direction X.

The second touch electrode members 130 may extend along the second direction Y and may be spaced apart from each other along the first direction X as described above. Each of the second touch electrode members 130 spaced apart from each other along the first direction X may form a column. In FIG. 3, seven of second touch electrode members 130 are disposed along the first direction X to respectively form a first column CO1, a second column CO2, a third column CO3, a fourth column CO4, a fifth column CO5, a sixth column CO6, and a seventh column CO7 arranged sequentially along a direction opposite to the first direction X. However, the present disclosure is not limited to this case, and the number of the second touch electrode members 130 can be variously changed.

Each of the second touch electrode members 130 may include a plurality of second touch electrodes 131 arranged along the second direction Y and a plurality of second connection portions 133, each electrically connecting the second touch electrodes 131 neighboring each other along the second direction Y.

The second touch electrodes 131 may be electrically connected to each other along the second direction Y. In addition, the second touch electrodes 131 may be spaced apart from each other along the first direction X.

In some exemplary embodiments, the second touch electrodes 131 spaced apart from each other along the first direction y may form rows. In FIG. 3, eight of the second touch electrodes 131 are disposed in one column, and the second touch electrodes 131 arranged along the first direction y form a first row RO1, a second row RO2, a third row RO3, a fourth row RO4, a fifth row RO5, a sixth row RO6, a seventh row RO7, and an eighth row RO8. However, the present disclosure is not limited to this case, and the number of rows formed by the second touch electrodes 131 can be variously changed.

In some exemplary embodiments, a row formed by second touch electrodes 131 may be located between two electrode rows formed by first touch electrode members 120. For example, the first row RO1 may be located between the first electrode row RE1 and the second electrode row RE2, and the second row RO2 may be located between the second electrode row RE2 and the third electrode row RE3. That is, a row formed by second touch electrodes 131 and a row formed by a first touch electrode member 120 may be repeatedly arranged along the second direction Y.

Each of the second touch electrodes 131 may include a second opening OP2. For example, at least a central portion of each of the second touch electrodes 131 may be open to expose a layer located under the second touch electrode 131. For example, when the insulating to layer IL is located under the second touch electrodes 131, a portion of the insulating layer IL may be exposed through each of the second openings OP2.

In some exemplary embodiments, the area of each of the second openings OP2 may be different from the area of each of the first openings OP1. For example, the area of each of the second openings OP2 may be larger than the area of each of the first openings OP1.

In some exemplary embodiments, the second touch electrodes 131 may be located in the same first layer L1 as the first touch electrodes 121. The second touch electrodes 131 may have a rhombic planar shape. However, the planar shape of the second touch electrodes 131 is not limited to the rhombic shape and can be changed to various shapes such as a triangle, a quadrilateral other than a rhombus, a pentagon, a circle, and a bar.

Each of the second connection portions 133 may electrically connect the second touch electrodes 131 neighboring each other along the second direction Y and may contact the second touch electrodes 131. In some exemplary embodiments, the second connection portions 133 may be located in the same first layer L1 as the first touch electrodes 121 and the second touch electrodes 131.

The second connection portions 133 may be insulated from the first connection portions 123 and may intersect the first connection portions 123. In some exemplary embodiments, the insulating layer IL may be located between the second connection portions 133 and the first connection portions 123.

The second touch electrodes 131 and the second connection portions 133 may include a conductive material. In some exemplary embodiments, the second touch electrodes 131 and the second connection portions 133 may be made of the same conductive material as the first touch electrodes 121.

In some exemplary embodiments, when the first touch electrodes 121 have a mesh structure, the second touch electrodes 131 and the second connection portions 133 may also have a mesh structure.

In some exemplary embodiments, each of the second touch electrodes 131 may be a driving electrode that receives the driving signal Ts for detecting a touch position, and each of the first touch electrodes 121 may be a sensing electrode that outputs the sensing signal Rs for detecting a touch position.

The strain gauge 150 may be located in the sensing area SA of the sensor unit 100. The strain gauge 150 may be located in electrode rows formed by the first touch electrode members 120. For example, the strain gauge 150 may be located in the first electrode row RE1, the second electrode row RE2, the third electrode row RE3, the fourth electrode row RE4, the fifth electrode row RE5, the sixth electrode row RE6, the seventh electrode row RE7, and the eighth electrode row RE8.

The strain gauge 150 may include first resistance lines 151, first connection lines 153, and second connection lines 155.

The first resistance lines 151 may be located in the first openings OP1 formed in the first touch electrodes 121 and may be spaced apart from the first touch electrodes 121. In some exemplary embodiments, the first resistance lines 151 may be located in the first openings OP1, respectively.

Each of the first resistance lines 151 may be bent to have a predetermined pattern. When pressure having certain intensity is applied to the sensor unit 100 of the touch sensor TSM, the length or cross-sectional area of the first resistance line 151 is changed. The change in the length or cross-sectional area of the first resistance line 151 causes a change in the resistance value of the first resistance line 151, and the intensity of the touch pressure may be determined based on the changed resistance value.

In some exemplary embodiments, as illustrated in FIG. 6, each of the first resistance lines 151 may include two or more bent portions and a portion extending in a direction intersecting the first direction X and the second direction Y in plan view.

The shape of each of the first resistance lines 151 can be variously changed. For example, as illustrated in FIG. 7, a first resistance line 151-1 may include a plurality of bent portions and a portion extending parallel to the first direction X in plan view. In another exemplary embodiment, a first resistance line 151-2 may be formed in an angular spiral shape as illustrated in FIG. 8 or may be formed in a circular spiral shape.

In some exemplary embodiments, the first resistance lines 151 may be located in the same first layer L1 as the first touch electrodes 121 and the second touch electrodes 131.

The first resistance lines 151 may include a conductive material. In some exemplary embodiments, the first resistance lines 151 may be made of the same material as the first touch electrodes 121 and the second touch electrodes 131.

When the first and second touch electrodes 121 and 131 have a mesh structure, each of the first resistance lines 151 may be formed by removing a portion of a mesh structure. When each of the first resistance lines 151 is formed by removing a portion of a mesh structure, a plurality of branches BR connected to the first resistance line 151 and spaced apart from each other may be further located in each first opening OP1 in some exemplary embodiments, as illustrated in FIG. 9.

The branches BR may be portions remaining after the removal of a portion of the mesh structure. The branches BR may be spaced apart from the first touch electrodes 121. The branches BR may be located in the same first layer L1 as the first resistance lines 151 and may be made of the same material as the first resistance lines 151.

Each of the first connection lines 153 may electrically connect the first resistance lines 151 neighboring each other along the first direction X and may directly contact the first resistance lines 151. The first connection lines 153 may be spaced apart from the first touch electrode members 120 and the second touch electrode members 130 without contacting the first touch electrode members 120 and the second touch electrode members 130. In some exemplary embodiments, the first connection lines 153 may be located in the same second layer L2 as the first connection portions 123 and may be made of the same material as the first connection portions 123.

In some exemplary embodiments, the insulating layer IL may be located between the first resistance lines 151 and the first connection lines 153, and the first resistance lines 151 and the first connection lines 153 may be connected to and directly contact each other through second contact holes CH2 formed in the insulating layer IL.

In the drawings, one first connection line 153 is disposed between first resistance lines 151 neighboring each other along the first direction X. However, the number of the first connection lines 153 can be variously changed. For example, two or more first connection lines 153 may be disposed between two neighboring first resistance lines 151 neighboring each other along the first direction X.

Each of the second connection lines 155 may electrically connect the first resistance lines 151 located in electrode rows neighboring each other along the second direction Y and may directly contact the first resistance lines 151.

In some exemplary embodiments, each of the second connection lines 155 may connect two of first resistance lines 151 neighboring each other along the second direction Y and located at ends of neighboring electrode rows.

In some exemplary embodiments, the insulating layer IL may be located between the first resistance lines 151 and the second connection lines 155, and the first resistance lines 151 and the second connection lines 155 may be connected to and directly contact each other through the second contact holes CH2 formed in the insulating layer IL. The second connection lines 155 may be spaced apart from the first touch electrode members 120 and the second touch electrode members 130 without contacting the first touch electrode members 120 and the second touch electrode members 130. In some exemplary embodiments, the second connection lines 155 may be located in the same second layer L2 as the first connection portions 123 and may be made of the same material as the first connection portions 123.

The exemplary connection relationship between the second connection lines 155 and the first resistance lines 151 may be as follows.

A second connection line 155 located between the first electrode row RE1 and the second electrode row RE2 may contact a first resistance line 151 located in the first electrode row RE1 and the first electrode column CE1 and a first resistance line 151 located in the second electrode row RE2 and the first electrode column CE1. That is, the first resistance line 151 located in the first electrode row RE1 and the first electrode column CE1 and the first resistance line 151 located in the second electrode row RE2 and the first electrode column CE1 may be electrically connected to each other by the second connection line 155 located between the first electrode row RE1 and the second electrode row RE2.

A first resistance line 151 located in the second electrode row RE2 and the eighth electrode column CE8 and a first resistance line 151 located in the third electrode row RE3 and the eighth electrode column CE8 may be electrically connected to each other by a second connection line 155 located between the second electrode row RE2 and the third electrode row RE3.

A first resistance line 151 located in the third electrode row RE3 and the first electrode column CE1 and a first resistance line 151 located in the fourth electrode row RE4 and the first electrode column CE1 may be electrically connected to each other by a second connection line 155 located between the third electrode row RE3 and the fourth electrode row RE4.

A first resistance line 151 located in the fourth electrode row RE4 and the eighth electrode column CE8 and a first resistance line 151 located in the fifth electrode row RE5 and the eighth electrode column CE8 may be electrically connected to each other by a second connection line 155 located between the fourth electrode row RE4 and the fifth electrode row RE5.

A first resistance line 151 located in the fifth electrode row RE5 and the first electrode column CE1 and a first resistance line 151 located in the sixth electrode row RE6 and the first electrode column CE1 may be electrically connected to each other by a second connection line 155 located between the fifth electrode row RE5 and the sixth electrode row RE6.

A first resistance line 151 located in the sixth electrode row RE6 and the eighth electrode column CE8 and a first resistance line 151 located in the seventh electrode row RE7 and the eighth electrode column CE8 may be electrically connected to each other by a second connection line 155 located between the sixth electrode row RE6 and the seventh electrode row RE7.

A first resistance line 151 located in the seventh electrode row RE7 and the first electrode column CE1 and a first resistance line 151 located in the eighth electrode row RE8 and the first electrode column CE1 may be electrically connected to each other by a second connection line 155 located between the seventh electrode row RE7 and the eighth electrode row RE8.

That is, the first resistance lines 151 located in the sensing area SA may all be connected in series to each other by the first connection lines 153 and the second connection lines 155.

In some exemplary embodiments, the second connection lines 155 may all be located within the sensing area SA as illustrated in FIG. 3. Alternatively, in an exemplary embodiment, a portion of each of the second connection lines 155 may be located in the peripheral area NSA.

The dummy electrodes 190 may be located in the second openings OP2 of the second touch electrodes 131. In some exemplary embodiments, the dummy electrodes 190 may be disposed in the second openings OP2, respectively. The second openings OP2 formed in the second touch electrodes 131 may cause a difference in external light reflectance. Accordingly, pattern stains may be visible from the outside. The dummy electrodes 190 reduce the difference in external light reflectance, thereby reducing the possibility of pattern stains being visible from the outside.

In some exemplary embodiments, the dummy electrodes 190 may have the same shape as the second openings OP2. For example, when each of the second openings OP2 is shaped like a quadrilateral such as a rhombus, each of the dummy electrodes 190 may also be shaped like a quadrilateral such as a rhombus.

The dummy electrodes 190 may be disposed in the second openings OP2 and spaced apart from the second touch electrodes 131. That is, each of the dummy electrodes 190 may be an island pattern. In some exemplary embodiments, each of the dummy electrodes 190 may be a floating electrode.

The dummy electrodes 190 may be located in the same first layer L1 as the first touch electrodes 121, the second touch electrodes 131 and the first resistance lines 151 and may be made of the same material as the first touch electrodes 121, the second touch electrodes 131 and the first resistance lines 151.

In some exemplary embodiments, when the second touch electrodes 131 have a mesh structure, the dummy electrodes 190 may also have a mesh structure as illustrated in FIG. 10.

In some exemplary embodiments, first, second, and third wirings 901, 903, and 903' and signal lines 9111 and 9113 may be disposed on the peripheral area NSA of the base layer 110.

For example, the first, second, and third wirings 901, 903, and 903' may include a first wiring 901 connected to each of the first touch electrode members 120, a second wiring 903 connected to an end of each of the second touch electrode members 130, and a third wiring 903' connected to the other end of each of the second touch electrode members 130. Here, the other end of each of the second touch electrode members 130 refers to an end opposite to an end of each second touch electrode member 130 to which the second wiring 903 is connected. That is, a wiring connected to each of the second touch electrode members 130 may have a double routing structure, which can improve a resistive-capacitive (RC) delay caused by the resistance of the second touch electrode members 130. However, the present disclosure is not limited to this case. For example, the second wiring 903 may be connected to an end of each of the second touch electrode members 130, and no wiring may be connected to the other end of each of the second touch electrode members 130, unlike in FIG. 3. That is, in an exemplary embodiment, a wiring connected to each of the second touch electrode members 130 may have a single routing structure.

The signal lines 9111 and 9113 may include a first signal line 9111 connected to an end of the strain gauge 150 and a second signal line 9113 connected to the other end of the strain gauge 150.

In some exemplary embodiments, the first signal line 9111 may be connected to an end of the strain gauge 150. For example, the first signal line 9111 may be connected to a first resistance line 151 located in the eighth electrode row RE8 and the eighth electrode column CE8 in the strain gauge 150.

In some exemplary embodiments, the second signal line 9113 may be connected to the other end of the strain gauge 150. For example, the second signal line 9113 may be connected to a first resistance line 151 located in the first electrode row RE1 and the eighth electrode column CE8 in the strain gauge 150.

In some exemplary embodiments, the first signal line 9111 and the second signal line 9113 may be located on the opposite side of the sensing area SA from the first wirings 901. In some exemplary embodiments, the first signal line 9111 and the second signal line 9113 may be located in the peripheral area NSA, but may be located between the third wirings 903' and the sensing area SA.

Pad portions TP1 and TP2 may be located on the peripheral area NSA of the base layer 110. The pad portions TP1 and TP2 may be electrically connected to the wirings 901, 903 and 903' and the signal lines 9111 and 9113. In addition, the controller 200 may be electrically connected to the pad portions TP1 and TP2.

In some exemplary embodiments, the pad portions TP1 and TP2 may include a first pad portion TP1 and a second pad portion TP2 spaced apart from each other along the first direction X. The first pad portion TP1 may be connected to the second wirings 903 and the third wirings 903', and the second pad portion TP2 may be connected to the first wirings 901. However, the present disclosure is not limited to this case. For example, the first pad portion TP1 and the second pad portion TP2 may form one pad portion without being spaced apart from each other. In addition, wirings and signal lines connected to each of the first pad portion TP1 and the second pad portion TP2 can be variously changed.

In the touch sensor TSM according to the above-described embodiment, since the first touch electrodes 121, the second touch electrodes 131 and the first resistance lines 151 are located in the same first layer L1, they can be simultaneously formed in the same process, thus simplifying the manufacturing process. In addition, since the first touch electrodes 121, the second touch electrodes 131 and the first resistance lines 151 are located in the same first layer L1, the touch sensor TSM can be implemented as a thin sensor while having a pressure sensing function.

Further, since the first connection lines 153 and the second connection lines 155 of the strain gauge 150 are located in the same second layer L2 as the first connection portions 123, they can be formed at the same time as the first connection portions 123 in the same process, thus further simplifying the manufacturing process.

In addition, since the strain gauge 150 is disposed substantially all over the sensing area SA, pressure sensing can be performed all over the sensing area SA, thus improving to the convenience of operation of the display device 1.

In some exemplary embodiments, the structure of the touch sensor TSM, in particular, the position of the first resistance lines 151 may be changed.

Figure 15:
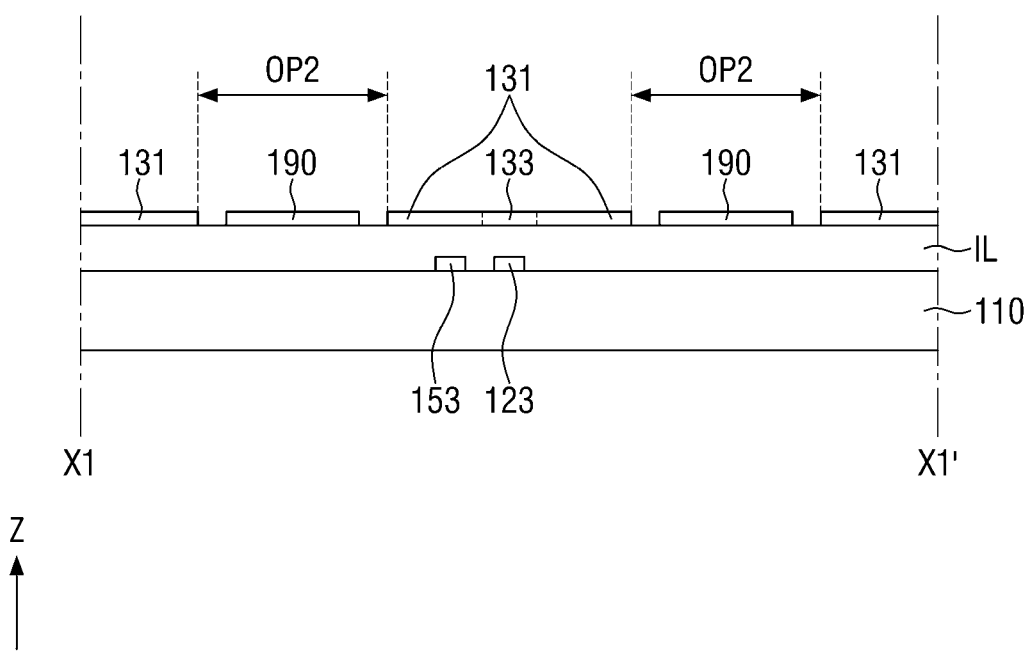
FIG. 15 is a cross-sectional view illustrating a modified structure of FIG. 12.
Figure 16:
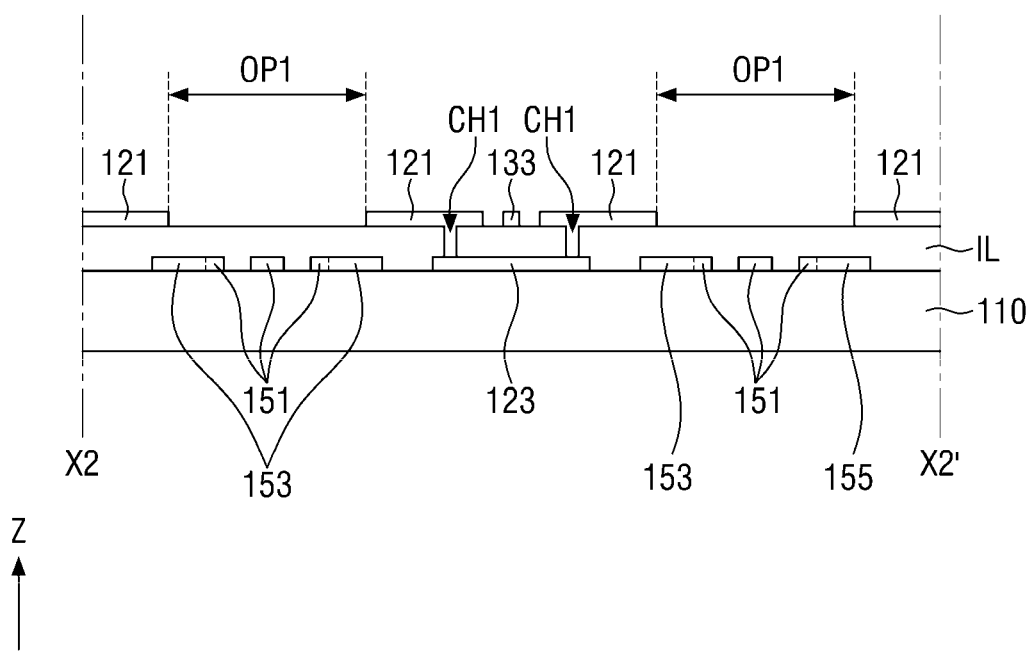
FIG. 16 is a cross-sectional view illustrating a modified structure of FIG. 13.
Figure 17:
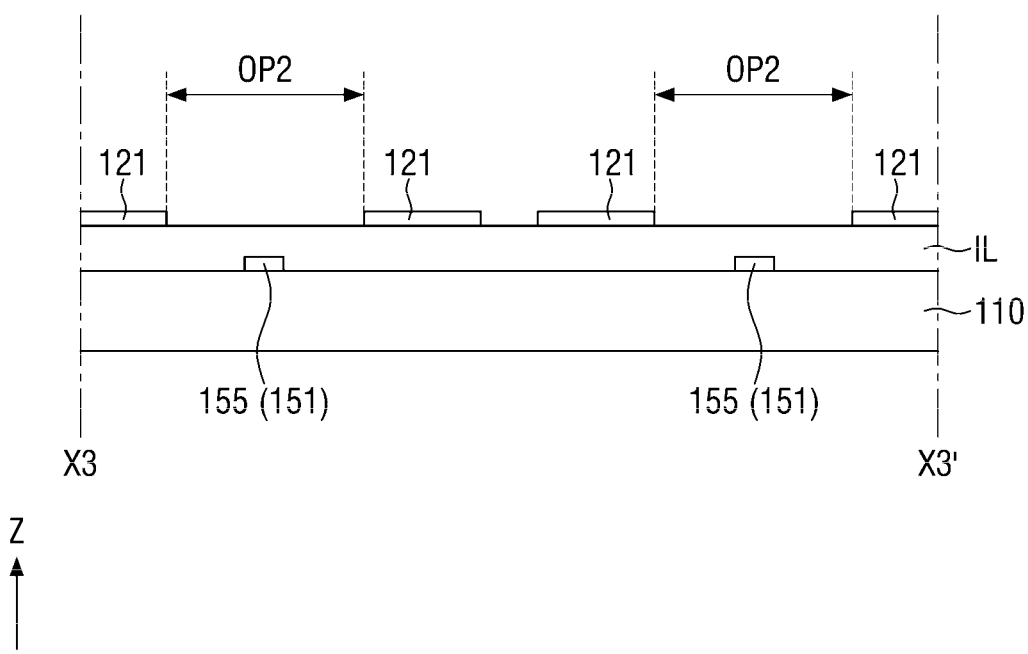
FIG. 17 is a cross-sectional view illustrating a modified structure of FIG. 14.

FIG. 15 is a cross-sectional view illustrating a modified structure of FIG. 12. FIG. 16 is a cross-sectional view illustrating a modified structure of FIG. 13. FIG. 17 is a cross-sectional view illustrating a modified structure of FIG. 14. Referring to FIGS. 15 through 17 in addition to FIGS. 3 through 14, in some exemplary embodiments, first resistance lines 151 may be located in a different layer from first touch electrodes 121, unlike in FIGS. 12 through 14. For example, the first resistance lines 151 may be located in the same second layer L2 as a first connection line 153, a second connection line 155 and a first connection portion 123.

When the first resistance lines 151 are located in the second layer L2, they may be made of the same material as the first connection line 153, the second connection line 155 and the first connection portion 123 and may be formed together with the first connection line 153, the second connection line 155 and the first connection portion 123.

According to an exemplary embodiment, the base layer 110 serving as the base of the sensor unit 100 may be a thin-film encapsulation layer of an organic light emitting display panel. In this case, the base layer 110 may be implemented as a multilayer including at least one organic layer and at least one inorganic layer or may be implemented as a single layer including a combination of organic and inorganic materials. For example, the base layer 110 may be a multilayer including at least two inorganic layers and at least one organic layer interposed between the inorganic layers. In a display device in which the base layer 110 is implemented as a thin-film encapsulation layer of an organic light emitting display panel, electrodes constituting the sensor unit 100 and components constituting the display panel 300 may be formed on different surfaces of the base layer 110.

Figure 18:
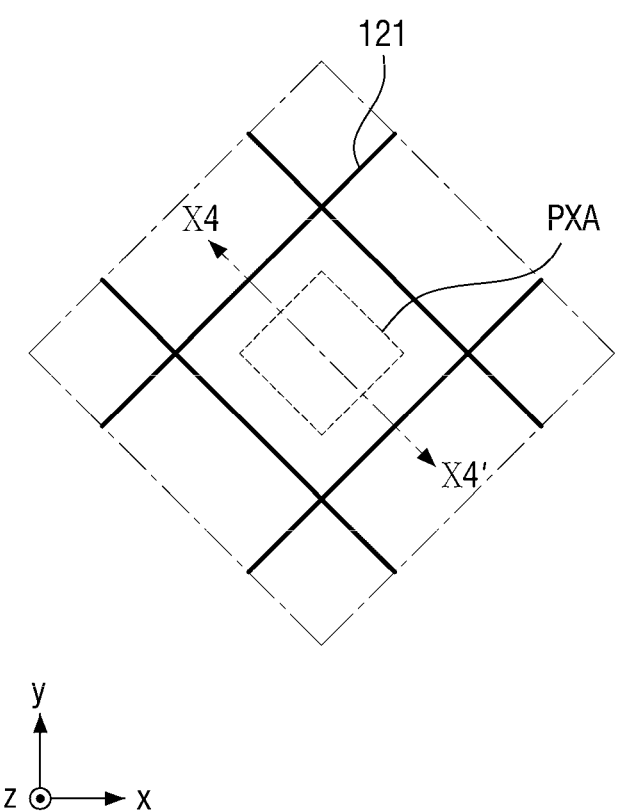
FIG. 18 is an enlarged plan view of a portion Q4 of FIG. 5.
Figure 19:
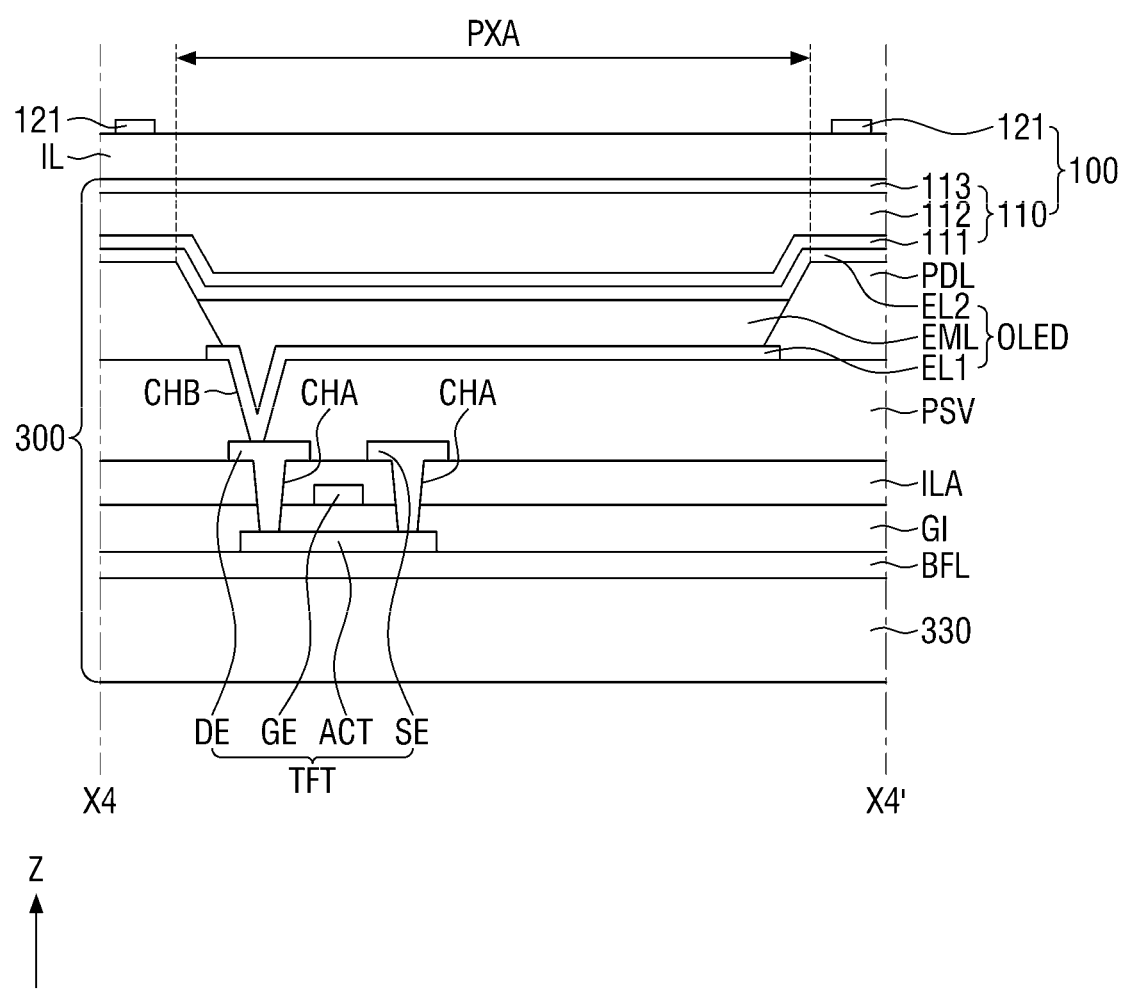
FIG. 19 is a cross-sectional view of the sensor unit and a display panel taken along a sectional line X4-X4' of FIG. 18.

FIG. 18 is an enlarged plan view of a portion Q4 of FIG. 5. FIG. 19 is a cross-sectional view of the sensor unit 100 and the display panel 300 taken along a sectional line X4-X4' of FIG. 18.

Referring additionally to FIGS. 18 and 19, the sensor unit 100 may include a thin-film encapsulation layer of the display panel 300 (in particular, an organic light emitting display panel) as the base layer 110. That is, the display panel 300 and the sensor unit 100 may be formed integrally with each other. Hereinafter, the thin-film encapsulation layer 110 will be referred to with the same reference number with the base layer 110. For convenience, only a light emitting element OLED (e.g., an organic light emitting diode) and one thin-film transistor TFT connected to the light emitting element OLED among components provided in each pixel of the display panel 300 are illustrated in FIG. 19.

The display panel 300 includes a base substrate 330, the light emitting element OLED provided on a surface of the base substrate 330, and the thin-film encapsulation layer 110 provided on the light emitting element OLED and covering at least the light emitting element OLED. In addition, according to an exemplary embodiment, the display panel 300 may further include at least one thin-film transistor TFT connected to the light emitting element OLED. The thin-film transistor TFT may be located between the base substrate 330 and the light emitting element OLED.

The display panel 300 may further include at least one power supply line, a signal line, and/or a capacitor not illustrated in the drawings.

According to an exemplary embodiment, the base substrate 330 may be a rigid substrate or a flexible substrate, and the material of the base substrate 330 is not particularly limited. For example, the base substrate 330 may be a thin-film substrate having flexible characteristics.

A buffer layer BFL is provided on the surface of the base substrate 330. The buffer layer BFL may prevent or limit the diffusion of impurities from the base substrate 330 and improve the flatness of the base substrate 330. The buffer layer BFL may be provided as a single layer, but may also be provided as a multilayer composed of at least two layers. The buffer layer BFL may be an inorganic insulating layer made of an inorganic material. For example, the buffer layer BFL may be made of silicon nitride, silicon oxide, or silicon oxynitride.

The thin-film transistor TFT is provided on the buffer layer BFL. The thin-film transistor TFT includes an active layer ACT, a gate electrode GE, a source electrode SE, and a drain electrode DE. According to an exemplary embodiment, the active layer ACT may be provided on the buffer layer BFL and may be made of a semiconductor material. For example, the active layer ACT may be a semiconductor pattern made of polysilicon, amorphous silicon, or an oxide semiconductor. A region (e.g., a region overlapping the gate electrode GE) of the active layer ACT may not be doped with an impurity, and the other region may be doped with an impurity.

A gate insulating layer GI may be provided on the active layer ACT, and the gate electrode GE may be provided on the gate insulating layer GI. In addition, an interlayer insulating film ILA may be provided on the gate electrode GE, and the source electrode SE and the drain electrode DE may be provided on the interlayer insulating film ILA. The source electrode SE and the drain electrode DE may contact and be electrically connected to the active layer ACT respectively through contact holes CHA penetrating the gate insulating layer GI and the interlayer insulating film ILA.

According to an exemplary embodiment, a passivation layer PSV is provided on the source electrode SE and the drain electrode DE. The passivation layer PSV may cover the thin-film transistor TFT.

The light emitting element OLED is provided on the passivation layer PSV. The light emitting element OLED may include a first electrode EL1, a second electrode EL2, and a light emitting layer EML interposed between the first electrode EL1 and the second electrode EL2. According to an exemplary embodiment, the first electrode EL1 of the light emitting element OLED may be an anode. The first electrode EL1 of the light emitting element OLED may contact and be electrically connected to an electrode (e.g., the drain electrode DE) of the thin-film transistor TFT through a contact hole CHB penetrating the passivation layer PSV.

A pixel defining layer PDL for defining a light emitting area PXA of each pixel is provided on the surface of the base substrate 330 on which the first electrode EL1 of the light emitting element OLED, etc. are formed. The pixel defining layer PDL may expose an upper surface of the first electrode EL1 and protrude from the base substrate 330 along the periphery of each pixel area.

The light emitting layer EML is provided in the light emitting area PXA surrounded by the pixel defining layer PDL. For example, the light emitting layer EML may be disposed on the exposed surface of the first electrode EL1. According to an exemplary embodiment, the light emitting layer EML may have a multilayer thin-film structure including at least a light generation layer. For example, the light emitting layer EML may include a hole injection layer, a hole transport layer, a light generation layer, a hole blocking layer (HBL), an electron transport layer (ETL), and an electron injection layer (EIL). According to an exemplary embodiment, the color of light generated by the light emitting layer EML may be one of red, green, and blue. Alternatively, the color of light generated by the light emitting layer EML may be one of magenta, cyan, and yellow.

The second electrode EL2 of the light emitting element OLED may be disposed on the light emitting layer EML. The second electrode EL2 of the light emitting element OLED may be a cathode.

The thin-film encapsulation layer 110 may be provided on the second electrode EL2 of the light emitting element OLED to cover the second electrode EL2 of the light emitting element OLED. The thin-film encapsulation layer 110 seals the light emitting element OLED. The thin-film encapsulation layer 110 includes at least one inorganic layer (hereinafter, referred to as an encapsulating inorganic layer). The thin-film encapsulation layer 110 may further include at least one organic layer (hereinafter, referred to as an encapsulating organic layer). The encapsulating inorganic layer protects the light emitting element OLED from moisture/oxygen, and the encapsulating organic layer protects the light emitting element OLED from foreign matter such as dust particles. When the light emitting element OLED is sealed by using the thin-film encapsulation layer 110, the thickness of the display device 1 can be reduced, and flexible characteristics can be secured.

The thin-film encapsulation layer 110 may have a multi-layer structure or a single-layer structure. For example, the thin-film encapsulation layer 110 may include a first encapsulating inorganic layer 111, an encapsulating organic layer 112, and a second encapsulating inorganic layer 113 sequentially stacked on the second electrode EL2.

In some exemplary embodiments, each of the first encapsulating inorganic layer 111 and the second encapsulating inorganic layer 113 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), or lithium fluoride.

In some exemplary embodiments, the encapsulating organic layer 112 may be made of acrylic resin, methacrylic resin, polyisoprene, vinyl resin, epoxy resin, urethane resin, cellulose resin, or perylene resin.

The structure of the thin-film encapsulation layer 110 is not limited to the above example, and the stacked structure of the thin-film encapsulation layer 110 can be variously changed.

The components of the second layer L2 described above may be disposed on the thin-film encapsulation layer 110. The insulating layer IL may be located on the second layer L2, and the first layer L2 may be located on the insulating layer IL. In the drawings, the first touch electrodes 121 are illustrated as components of the first layer L1. The first touch electrodes 121 may have a mesh structure so as not to be visible to a user as described above and may be disposed to not overlap the light emitting areas PXA. In other words, mesh hole overlapping a light emitting area PXA, may be defined in each of the first touch electrodes 121 having the mesh structure.

In the display device 1 according to the above-described embodiment, the display panel 300 is implemented as an organic light emitting display panel having the thin-film encapsulation layer 110, and the components of the sensor unit 100 are disposed on the thin-film encapsulation layer 110. For example, the first and second connection lines 153 and 155 of the strain gauge 150, the first connection portions 123 of the first touch electrode members 120, etc. may be disposed on the thin-film encapsulation layer 110, the insulating layer IL may be disposed on the first and second connection lines 153 and 155 of the strain gauge 150, the first connection portions 123 of the first touch electrode members 120, etc., and the first touch electrodes 121, the second touch electrodes 131, the second connection portions 133, the first resistance lines 151 and the dummy electrodes 190 may be disposed on the insulating layer IL.

A touch position detection operation of the controller 200 will now be described by additionally referring to FIG. 20.

Figure 20:
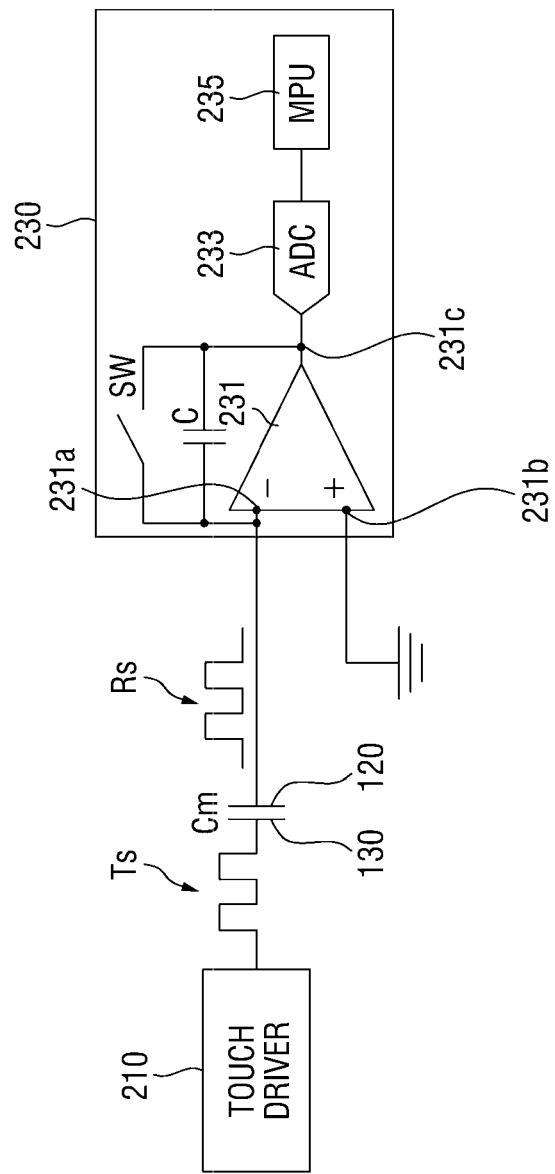
FIG. 20 is a diagram for explaining a touch position detection operation of the touch sensor according to an exemplary embodiment.

FIG. 20 is a diagram for explaining a touch position detection operation of the touch sensor TSM according to an exemplary embodiment.

Referring additionally to FIG. 20, the touch driver 210 may provide the driving signal Ts to the second touch electrode members 130 through the second wirings 903. In some exemplary embodiments, the driving signal Ts may be sequentially provided to each of the second touch electrode members 130.

The touch detector 230 may receive the sensing signal Rs from each of the first touch electrode members 120 through the first wirings 901. In some exemplary embodiments, the sensing signal Rs may include information about a change in mutual capacitance between a first touch electrode member 120 and a second touch electrode member 130 as described above. When the driving signal Ts is provided to each of the second touch electrode members 130, mutual capacitance Cm is formed between each second touch electrode member 130 and each first touch electrode member 120. When a touch input occurs, the mutual capacitance Cm may change, and the sensing signal Rs may include information about the change in the mutual capacitance Cm.

In some exemplary embodiments, the touch detector 230 may include at least one amplifier 231 such as an operational amplifier (OP amp), an ADC 233, and a processor 235.

The amplifier 231 may include a first input terminal 231a, a second input terminal 231b, and an output terminal 231c. According to an exemplary embodiment, the first input terminal 231a of the amplifier 231 (e.g., an inverting input terminal of an OP amp) may be electrically connected to each of the first touch electrode members 120 by the first wirings 901, and the sensing signal Rs may be input to the first input terminal 231a.

In some exemplary embodiments, the second input terminal 231b of the amplifier 231 (e.g., a non-inverting input terminal of the OP amplifier) may be a reference potential terminal and may be connected to, for example, a reference power source. In some exemplary embodiments, the reference power source may be a ground (GND) power source. A sensing signal Ns may be provided to the second input terminal 231b of the amplifier 231. Accordingly, reference voltages of the amplifiers 231 vary according to voltage variations of noise sensing electrode members 170, respectively. That is, reference potentials of the amplifiers 231 may vary according to potentials (voltage levels) of the noise sensing electrode members 170, respectively.

In some exemplary embodiments, a capacitor C and a reset switch SW may be connected in parallel to each other between the first input terminal 231a and the output terminal 231c of the amplifier 231.

In the above example, the amplifier 231 is implemented as a non-inverting amplifier. However, in an exemplary embodiment, the amplifier 231 may also be implemented as an inverting amplifier.

The output terminal 231c of the amplifier 231 may be electrically connected to the ADC 233.

The ADC 233 may convert an input analog signal into a digital signal. In some exemplary embodiments, the ADC 233 may be provided as many as the number of the first touch electrode members 120 so that the ADCs 233 can correspond one-to-one to the first touch electrode members 120. Alternatively, in an exemplary embodiment, the first touch electrode members 120 may be configured to share one ADC 233. In this case, a switch circuit for selecting a channel may be additionally provided.

The processor 235 processes a converted signal (digital signal) received from the ADC 233 and detects a touch input based on the signal processing result. For example, the processor 235 may comprehensively analyze a first sensing signal amplified by the amplifier 231 and converted by the ADC 233 to detect the occurrence of a touch input and the position of the touch input. According to an exemplary embodiment, the processor 235 may be implemented as a microprocessor (MPU). In this case, a memory required for driving the processor 235 may be additionally provided in the touch detector 230. However, the configuration of the processor 235 is not limited to this example. In another example, the processor 235 may be implemented as a microcontroller (MCU).

The touch pressure detection operation of the controller 200 will be described below by additionally referring to FIGS. 21 and 22.

Figure 21:
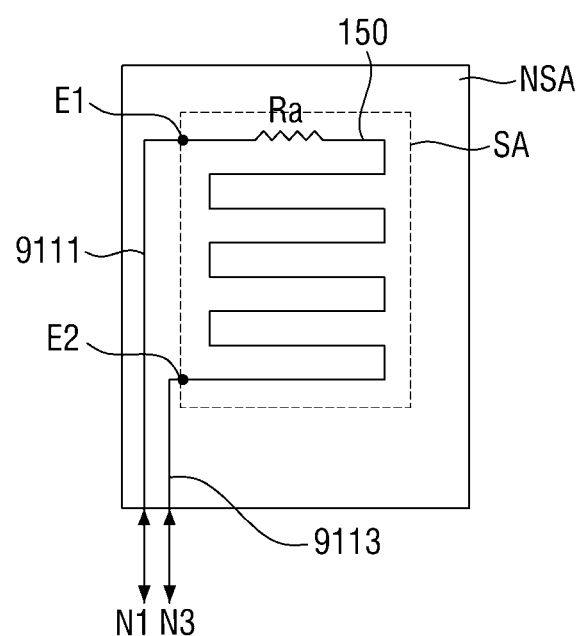
FIG. 21 is a plan view schematically illustrating the arrangement of a strain gauge, a first signal line and a second signal line illustrated in FIG. 3 and the connection relationship of the strain gauge, the first signal line and the second signal line with a Wheatstone bridge circuit.

FIG. 21 is a plan view schematically illustrating the arrangement of the strain gauge 150, the first signal line 9111 and the second signal line 9113 illustrated in FIG. 3 and the connection relationship of the strain gauge 150, the first signal line 9111 and the second signal line 9113 with a Wheatstone bridge circuit WB.

Figure 22:
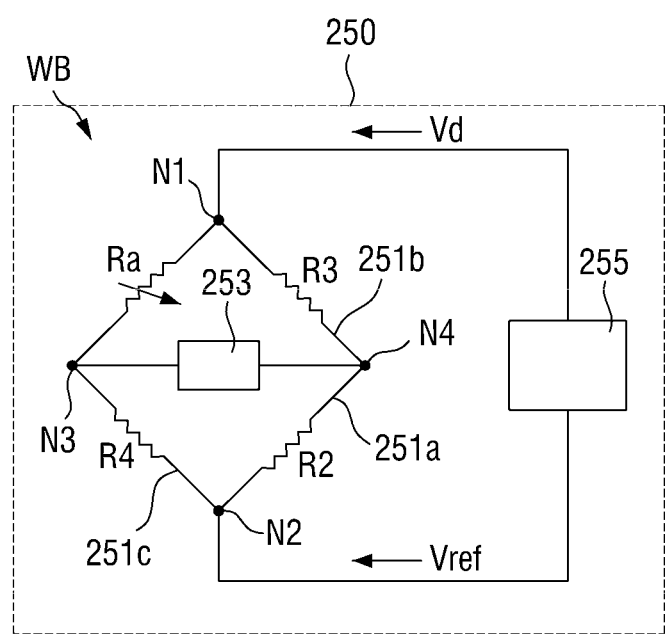
FIG. 22 is a circuit diagram of the Wheatstone bridge circuit electrically connected to the strain gauge of FIG. 21 explaining a touch pressure detection operation of the touch sensor according to an exemplary embodiment.

FIG. 22 is a circuit diagram of the Wheatstone bridge circuit electrically connected to the strain gauge 150 of FIG. 21 for explaining a touch pressure detection operation of the touch sensor TSM according to an exemplary embodiment.

Referring to FIGS. 21 and 22, the strain gauge 150 may include a first end E1 and a second end E2. As described above, the first end E1 of the strain gauge 150 may be connected to the first signal line 9111, and the second end E2 of the strain gauge 150 may be connected to the second signal line 9113.

In some exemplary embodiments, both the first end E1 and the second end E2 of the strain gauge 150 may be located in the peripheral area NSA on one side of the sensing area SA. For example, the first end E1 and the second end E2 of the strain gauge 150 may be located on a left side of the sensing area SA, as illustrated in the drawings.

The pressure detector 250 may include the Wheatstone bridge circuit WB.

The Wheatstone bridge circuit WB includes a first node N1, a second node N2, a first output node N3, and a second output node N4. In some exemplary embodiments, the first node N1 may be provided with a driving voltage Vd, and the second node N2 may be provided with a reference voltage Vref. In some exemplary embodiments, the reference voltage Vref may be a ground voltage.

In some exemplary embodiments, the Wheatstone bridge circuit WB may further include a first resistor 251a connected to the second node N2 and the second output node N4, a second resistor 251b connected to the first node N1 and the second output node N4, and a third resistor 251c connected to the second node N2 and the first output node N3.

In some exemplary embodiments, each of a resistance value R2 of the first resistor 251a, a resistance value R3 of the second resistor 251b and a resistance value R4 of the third resistor 251c may be a predetermined value. In an exemplary embodiment, each of the resistance value R2 of the first resistor 251a, the resistance value R3 of the second resistor 251b, and the resistance value R4 of the third resistor 251c may be a fixed value. In some exemplary embodiments, the resistance value R2 of the first resistor 251a, the resistance value R3 of the second resistor 251b, and the resistance value R4 of the third resistor 251c may be equal to each other.

In addition, in some exemplary embodiments, the Wheatstone bridge circuit WB may further include a first element 253 connected to the first output node N3 and the second output node N4 and a second element 255 connected to the first node N1 and the second node N2.

The first element 253 may sense an electrical flow between the first output node N3 and the second output node N4. For example, the first element 253 may be a galvanometer or a voltage measurer.

The second element 255 may be a voltage supply element for supplying a voltage to the first node N1 and the second node N2. In some exemplary embodiments, the second element 255 may provide the driving voltage Vd to the first node N1 and the reference voltage Vref to the second node N2.

In some exemplary embodiments, the first end E1 of the strain gauge 150 may be electrically connected to the first node N1 by the first signal line 9111, and the second end E2 of the strain gauge 150 may be connected to the first output node N3 by the second signal line 9113. Referring to FIG. 22, the resistance of the strain gauge 150 is represented as a variable resistance value Ra.

In the current embodiment, the strain gauge 150, the first resistor 251a, the second resistor 251b, and the third resistor 251c may be connected to each other to implement a Wheatstone bridge.

In some exemplary embodiments, when a touch input is not applied, the resistance value Ra of the strain gauge 150 may be substantially equal to the resistance value R2 of the first resistor 251a, the resistance value R3 of the second resistor 251b, and the resistance value R4 of the third resistor 251c.

When a touch input is not applied to the sensor unit 100, the resistance value R2 of the first resistor 251a, the resistance value R3 of the second resistor 251b, the resistance value R4 of the third resistor 251c and the resistance Ra of the strain gauge 150 may maintain an equilibrium state. In other words, the voltages of the first output node N3 and the second output node N4 may be equal to each other.

When a touch input is applied to the sensor unit 100, the shape of the strain gauge 150, for example, the shape of a first resistance line 151 may be changed according to the intensity of the touch or the applied pressure. The changed shape of the strain gauge 150 may change the resistance value Ra of the strain gauge 150. Accordingly, a voltage difference is generated between the first output node N3 and the second output node N4. The voltage difference or the amount of current generated by the voltage difference may be measured by the first element 253 to detect the intensity of the touch or the pressure of the touch.

The electrical connection relationship of the strain gauge 150 and the Wheatstone bridge circuit WB can be variously changed. For example, the position of the strain gauge 150 and the position of the third resistor 251c in FIG. 22 can be reversed.

That is, the touch sensor TSM according to the current embodiment can detect the position of a touch using the first touch electrode members 120, the second touch electrode members 130 and the touch driver 210 and detect the intensity of pressure using the strain gauge 150 and the pressure detector 250.

The strain gauge 150 of the touch sensor TSM can be used as an input device of various electronic devices including the display device 1. The strain gauge 150 can replace physical input buttons or can be used in combination with physical input buttons. For example, the intensity of pressure may be detected using the strain gauge 150 and the pressure detector 250, and a pre-programmed operation of the display device 1 may be output according to the intensity of the pressure.

For example, a pre-programmed function such as screen locking, screen unlocking, execution of operations of specific hardware (e.g., sensors such as fingerprint sensors), screen conversion, application calling, application execution, photographing, or call receiving may be performed.

Hereinafter, other embodiments will be described. In the following embodiments, the same components as those described above will be indicated by the same reference numerals, and a redundant description of the components will be omitted or given briefly. The following embodiments will be described, focusing mainly on differences from the previous embodiment.

Figure 23:
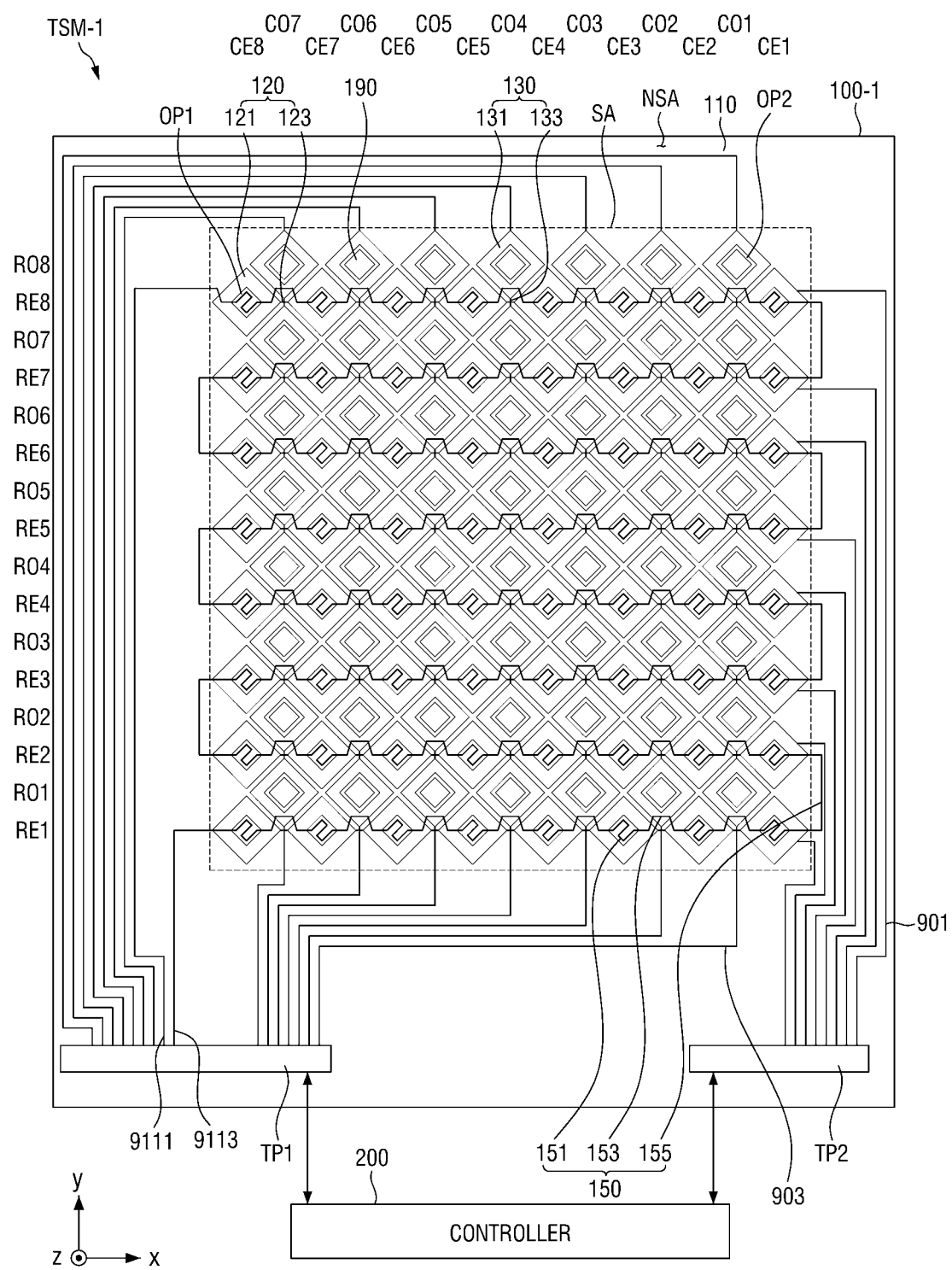
FIG. 23 is a plan view of a sensor unit of a touch sensor according to an exemplary embodiment and illustrates the connection relationship between the sensor unit and a controller.

FIG. 23 is a plan view of a sensor unit 100-1 of a touch sensor TSM-1 according to an exemplary embodiment and illustrates the connection relationship between the sensor unit 100-1 and a controller 200.

Referring to FIG. 23, the current embodiment is different from the exemplary embodiment of FIG. 3 in the configuration of the sensor unit 100-1 of the touch sensor TSM-1. More specifically, the current embodiment is substantially the same as or similar to the exemplary embodiment of FIG. 3 except that a portion of each second connection line 155 included in the sensor unit 100-1 is located in a peripheral area NSA.

Figure 24:
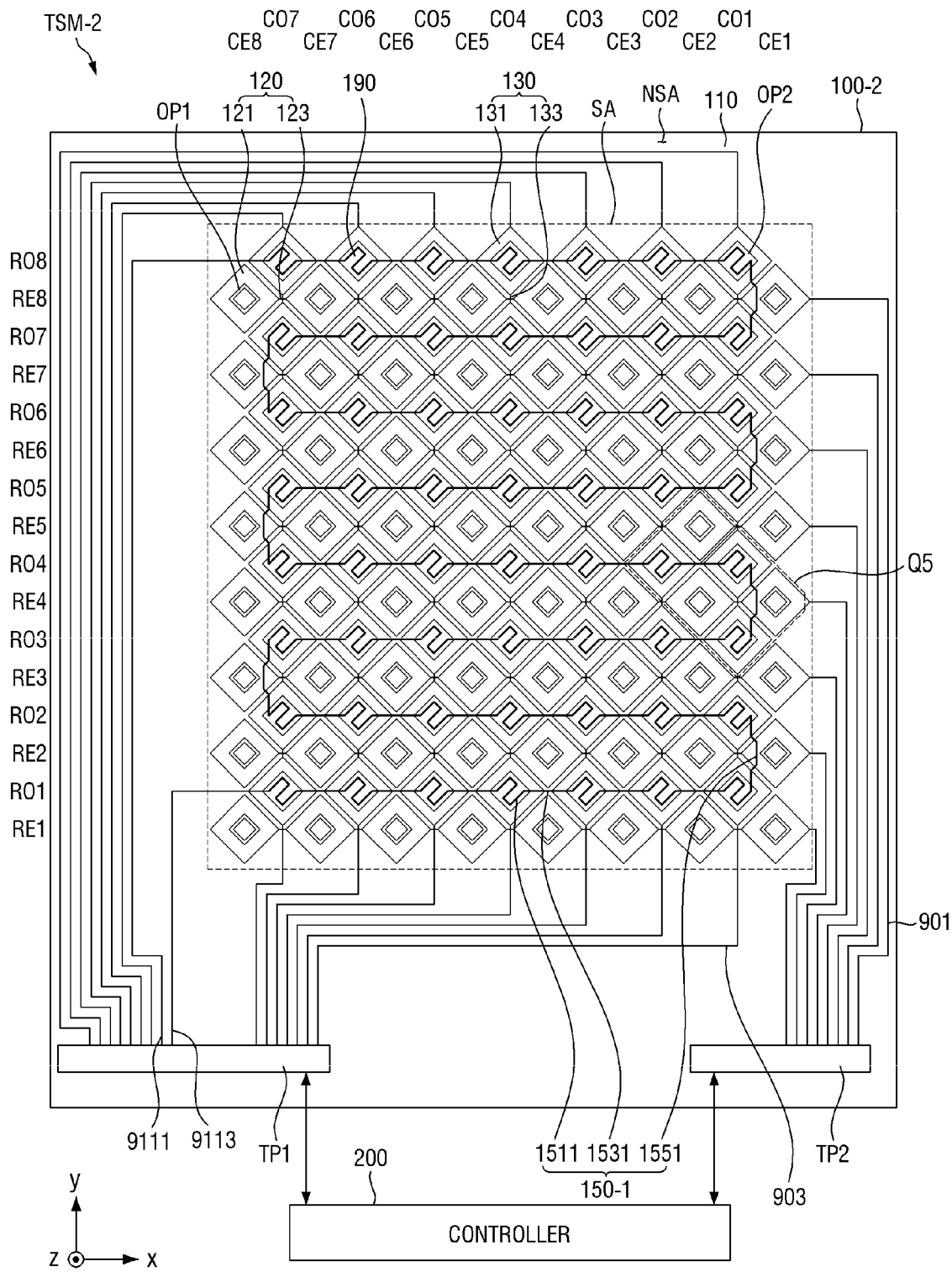
FIG. 24 is a plan view of a sensor unit of a touch sensor according to an exemplary embodiment and illustrates the connection relationship between the sensor unit and a controller.
Figure 25:
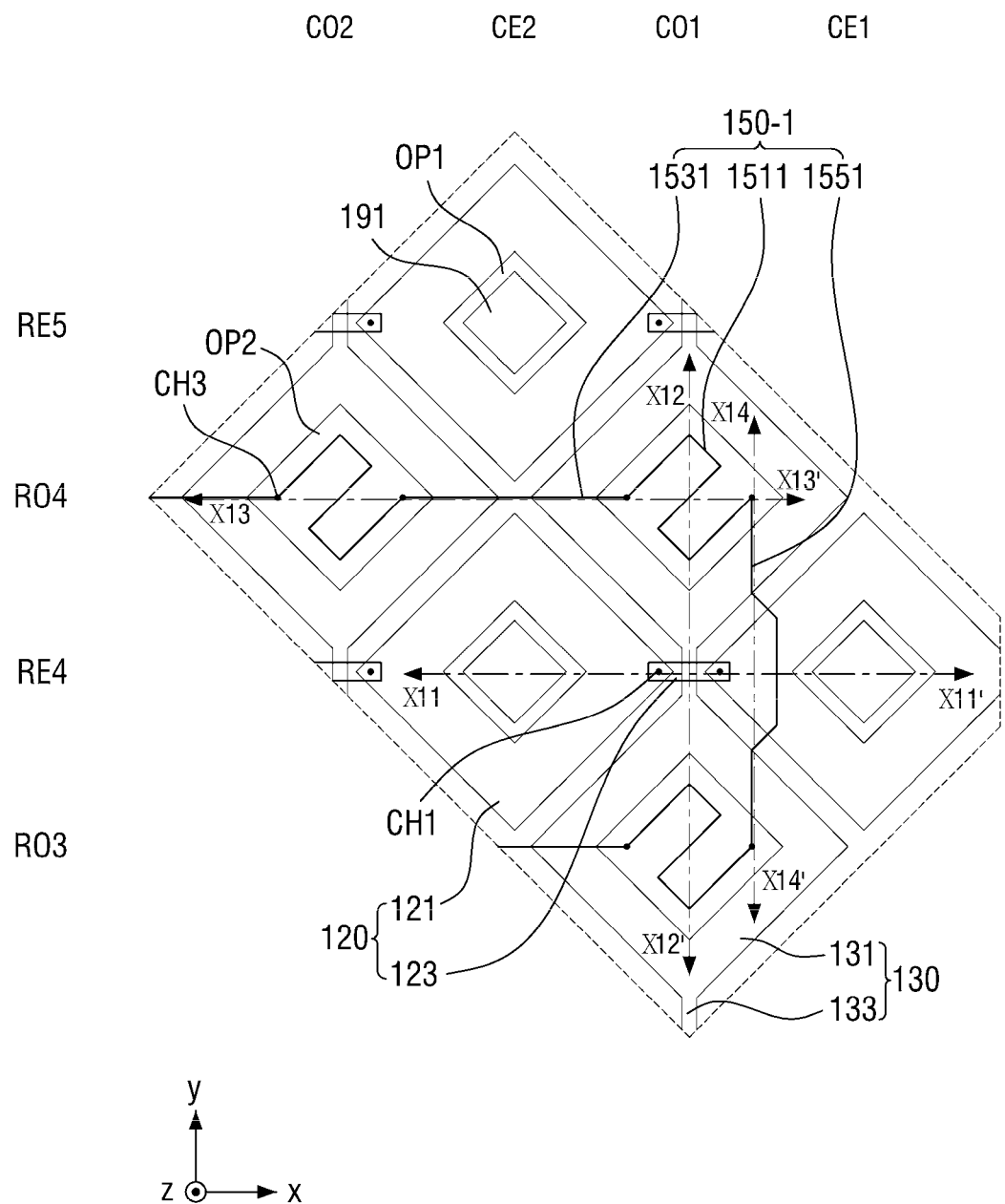
FIG. 25 is an enlarged view of a portion Q5 of FIG. 24.
Figure 26:
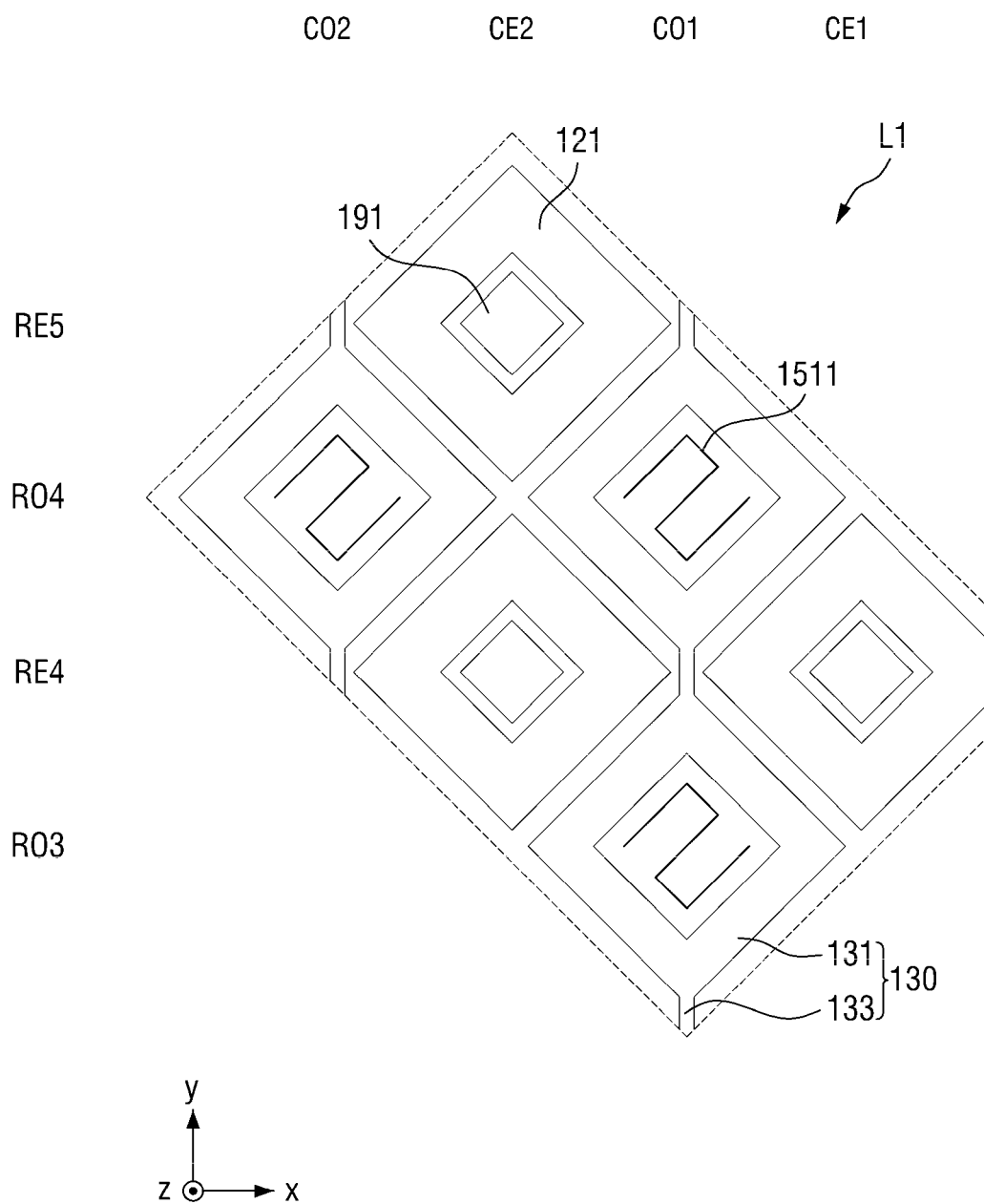
FIG. 26 illustrates the structure of a first layer of the sensor unit of FIG. 25.
Figure 27:
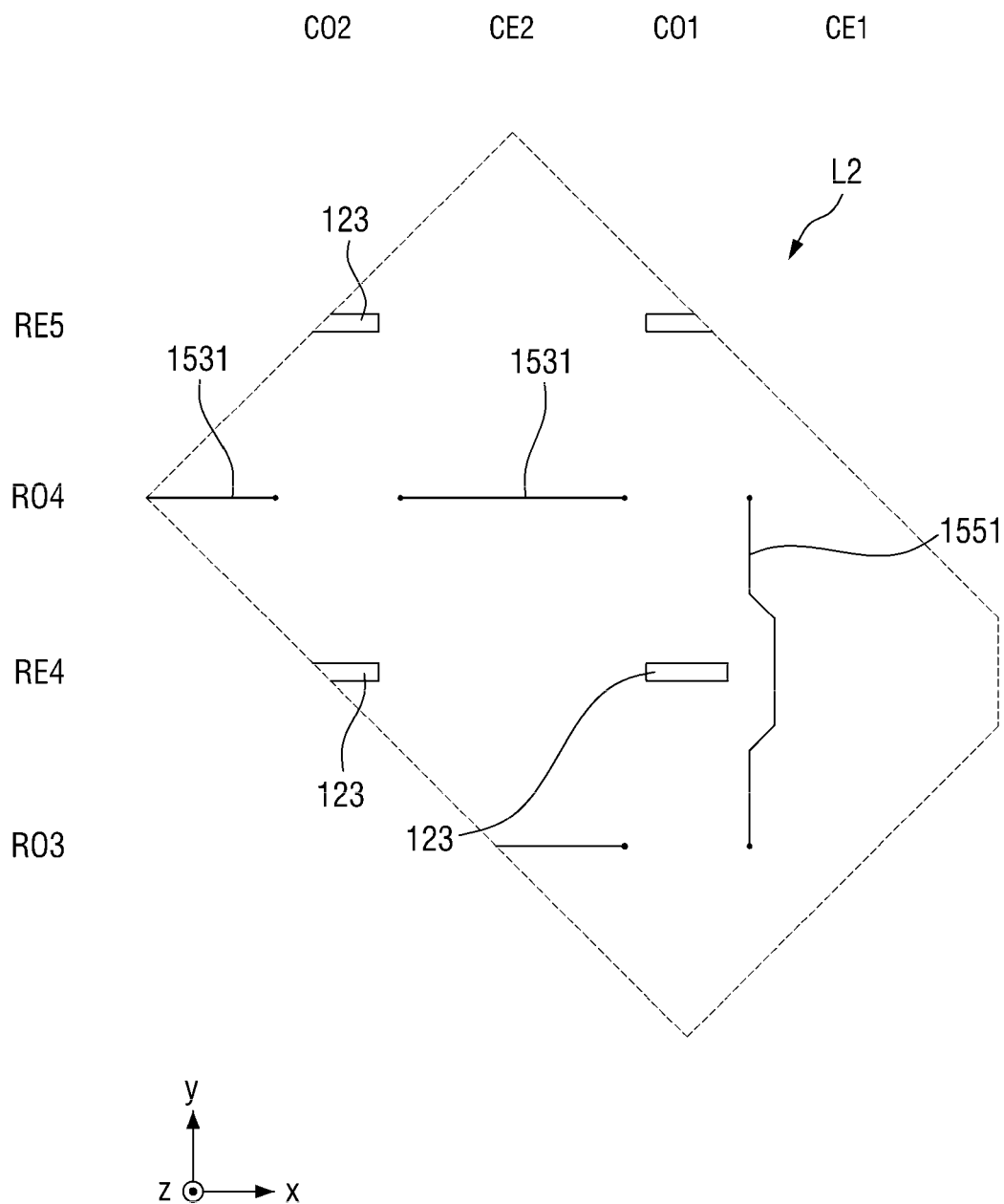
FIG. 27 illustrates the structure of a second layer of the sensor unit of FIG. 25.
Figure 28:
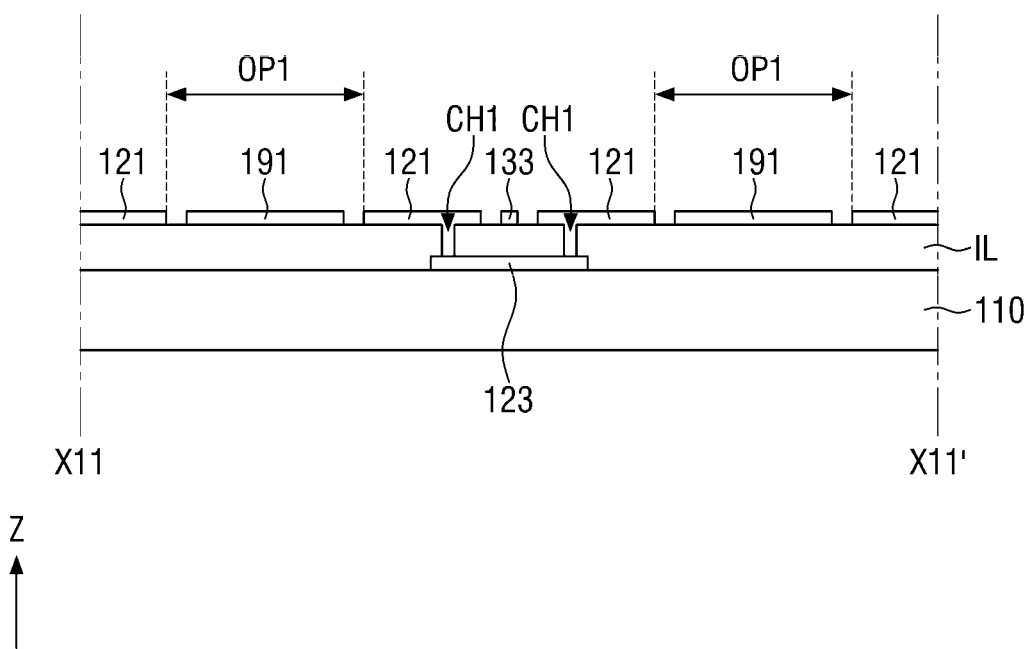
FIG. 28 is a cross-sectional view taken along a sectional line X11-X11' of FIG. 25.
Figure 29:
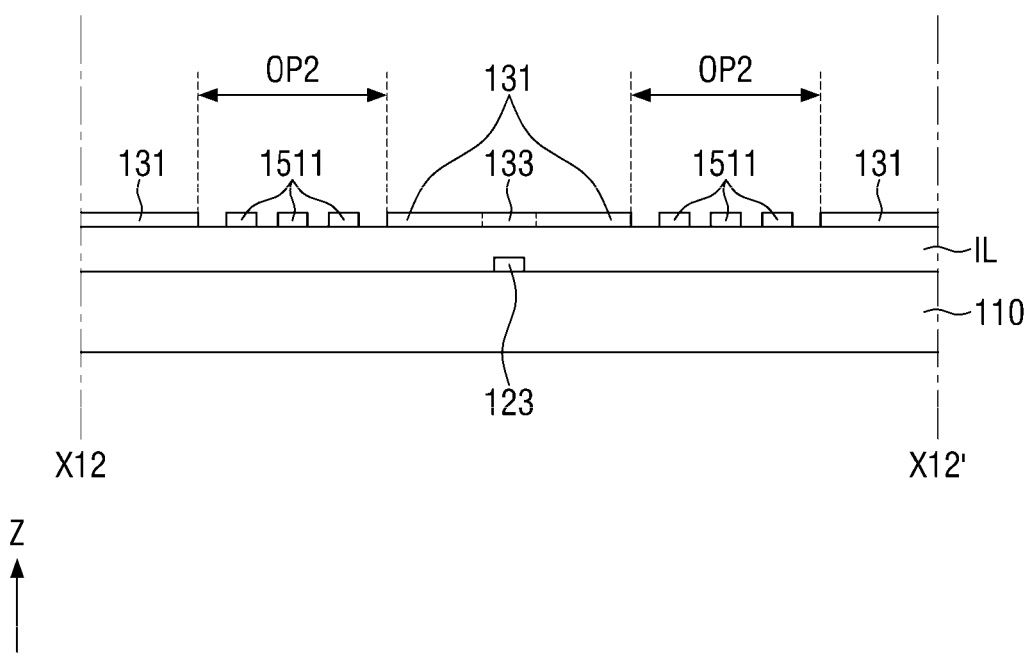
FIG. 29 is a cross-sectional view taken along a sectional line X12-X12' of FIG. 25.
Figure 30:
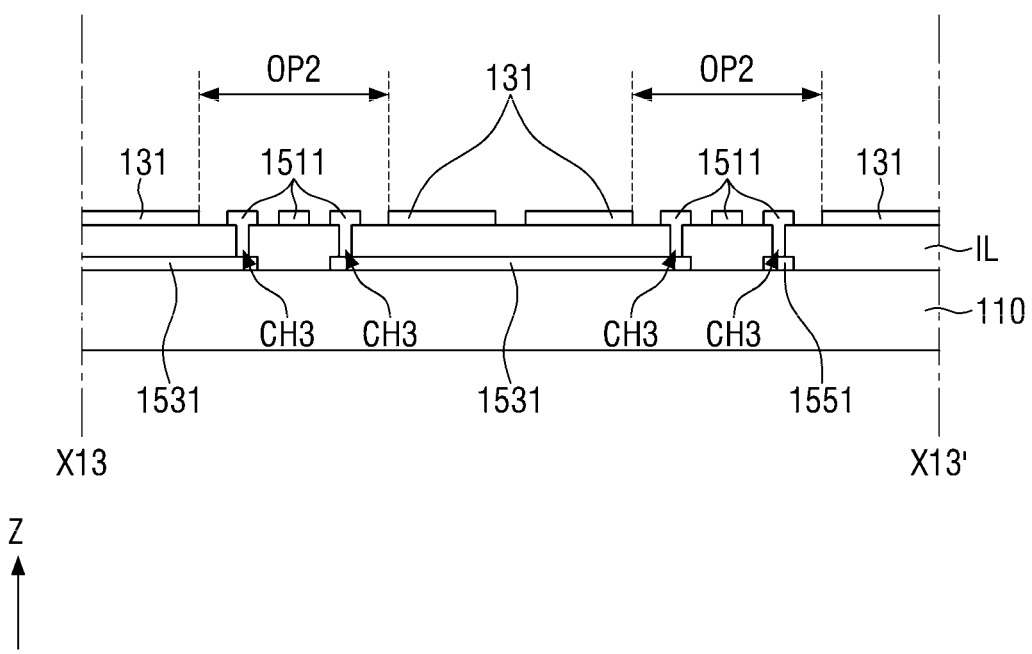
FIG. 30 is a cross-sectional view taken along a sectional line X13-X13' of FIG. 25.
Figure 31:
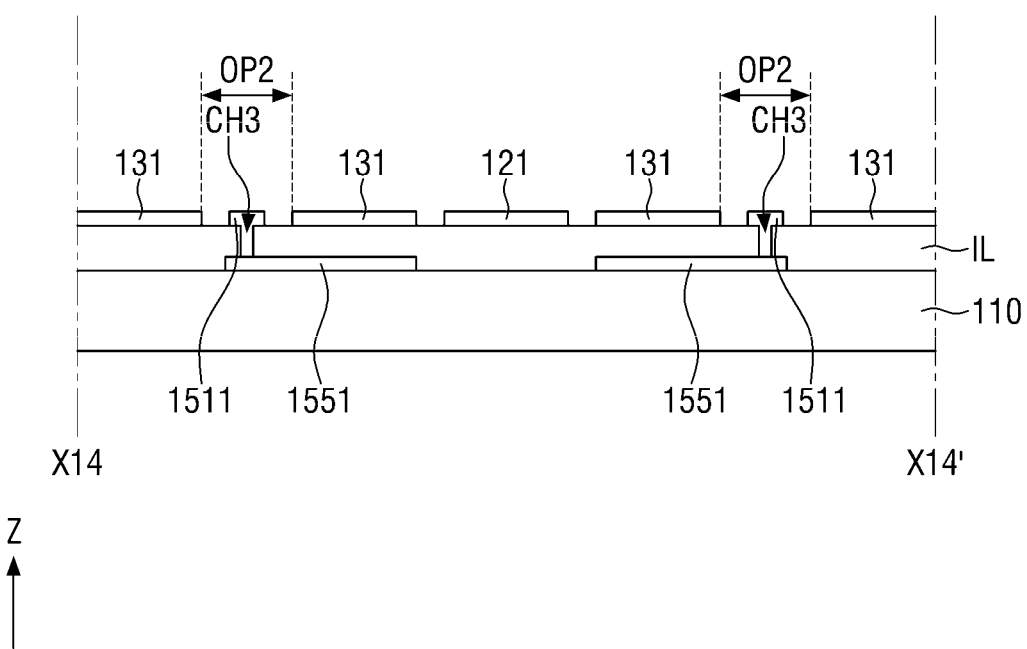
FIG. 31 is a cross-sectional view taken along a sectional line X14-X14' of FIG. 25.

FIG. 24 is a plan view of a sensor unit 100-2 of a touch sensor TSM-2 according to an exemplary embodiment and illustrates the connection relationship between the sensor unit 100_2 and a controller 200. FIG. 25 is an enlarged view of a portion Q5 of FIG. 24. FIG. 26 illustrates the structure of a first layer L1 of the sensor unit 100-2 of FIG. 25. FIG. 27 illustrates the structure of a second layer L2 of the sensor unit 100-2 of FIG. 25. FIG. 28 is a cross-sectional view taken along a sectional line X11-X11' of FIG. 25. FIG. 29 is a cross-sectional view taken along a sectional line X12-X12' of FIG. 25. FIG. 30 is a cross-sectional view taken along a sectional line X13-X13' of FIG. 25. FIG. 31 is a cross-sectional view taken along a sectional line X14-X14' of FIG. 25.

Referring to FIGS. 24 through 31, the touch sensor TSM-2 according to the current embodiment includes the sensor unit 100-2 and the controller 200.

The sensor unit 100-2 is substantially the same as or similar to the sensor unit 100 of FIG. 3 except that it includes a strain gauge 150-1 and dummy electrodes 191. Therefore, differences will be mainly described below.

The strain gauge 150-1 may be located within a sensing area SA and may be located in rows formed by second touch electrodes 131 of second touch electrode members 130. For example, the strain gauge 150-1 may be located in a first row RO1, a second row RO2, a third row RO3, a fourth row RO4, a fifth row RO5, a sixth row RO6, a seventh row RO7 and an eighth row RO8.

In some exemplary embodiments, each of the second touch electrode members 130 may be a driving electrode member as described above.

The strain gauge 150-1 may include second resistance lines 1511, third connection lines 1531, and fourth connection lines 1551.

The second resistance lines 1511 may be located in second openings OP2 formed in the second touch electrodes 131 and may be spaced apart from the second touch electrodes 131. In some exemplary embodiments, the second resistance lines 1511 may be located in the second openings OP2, respectively.

Each of the second resistance lines 1511 may be bent to have a predetermined pattern. In some exemplary embodiments, the shape of each of the second resistance lines 1511 may be substantially the same as the structure illustrated in FIG. 6. However, the shape of each of the second resistance lines 1511 can also be changed to shapes similar to the structures illustrated in FIGS. 7 and 8.

Other features of the second resistance lines 1511 may be substantially the same as those of the first resistance lines 151 described above.

In some exemplary embodiments, the second resistance lines 1511 may be located in the same first layer L1 as first touch electrodes 121 and the second touch electrodes 131. The second resistance lines 1511 may include a conductive material. In some exemplary embodiments, the second resistance lines 1511 may be made of the same material as the first touch electrodes 121 and the second touch electrodes 131.

In some exemplary embodiments, each of the second resistance lines 1511 may be formed by removing a portion of a mesh structure. In this case, a plurality of branches connected to the second resistance line 1511 may be further located in each second opening OP2 as illustrated in FIG. 9.

Each of the third connection lines 1531 may electrically connect the second resistance lines 1511 neighboring each other along the first direction X and may directly contact the second resistance lines 1511. The third connection lines 1531 may be spaced apart from first touch electrode members 120 and the second touch electrode members 130 without contacting the first touch electrode members 120 and the second touch electrode members 130. In some exemplary embodiments, the third connection lines 1531 may be located in the same second layer L2 as first connection portions 123 and may be made of the same material as the first connection portions 123.

In some exemplary embodiments, an insulating layer IL may be located between the second resistance lines 1511 and the third connection lines 1531, and the second resistance lines 1511 and the third connection lines 1531 may be connected to and directly contact each other through third contact holes CH3 formed in the insulating layer IL.

Although one of third connection line 1531 is illustrated as being disposed between second resistance lines 1511 neighboring each other along the first direction X, the present disclosure is not limited to this case. Two or more third connection lines 1531 can also be disposed between two of second resistance lines 1511 neighboring each other along the first direction X.

Each of the fourth connection lines 1551 may electrically connect the second resistance lines 1511 located in rows neighboring each other along the second direction Y and may directly contact the second resistance lines 1511.

In some exemplary embodiments, each of the fourth connection lines 1551 may connect two of second resistance lines 1511 neighboring each other along the second direction Y and located at ends of neighboring rows.

In some exemplary embodiments, the insulating layer IL may be located between the second resistance lines 1511 and the fourth connection lines 1551, and the second resistance lines 1511 and the fourth connection lines 1551 may be connected to and directly contact each other through the third contact holes CH3 formed in the insulating layer IL. The fourth connection lines 1551 may be spaced apart from first touch electrode members 120 and the second touch electrode members 130 without contacting the first touch electrode members 120 and the second touch electrode members 130. In some exemplary embodiments, the fourth connection lines 1551 may be located in the same second layer L2 as the first connection portions 123 and may be made of the same material as the first connection portions 123.

The exemplary connection relationship between the fourth connection lines 1551 and the second resistance lines 1511 may be as follows.

A fourth connection line 1551 located between the first row RO1 and the second row RO2 may contact a second resistance line 1511 located in the first row RO1 and a first column CO1 and a second resistance line 1511 located in the second row RO2 and the first column CO1. That is, the second resistance line 1511 located in the first row RO1 and the first column CO1 and the second resistance line 1511 located in the second row RO2 and the first column CO1 may be electrically connected to each other by the fourth connection line 1551 located between the first row RO1 and the second row RO2.

A second resistance line 1511 located in the second row RO2 and a seventh column CO7 and a second resistance line 1511 located in the third row RO3 and the seventh column CO7 may be electrically connected to each other by a fourth connection line 1551 located between the second row RO2 and the third row RO3.

A second resistance line 1511 located in the third row RO3 and the first column CO1 and a second resistance line 1511 located in the fourth row RO4 and the first column CO1 may be electrically connected to each other by a fourth connection line 1551 located between the third row RO3 and the fourth row RO4.

A second resistance line 1511 located in the fourth row RO4 and the seventh column CO7 and a second resistance line 1511 located in the fifth row RO5 and the seventh column CO7 may be electrically connected to each other by a fourth connection line 1551 located between the fourth row RO4 and the fifth row RO5.

A second resistance line 1511 located in the fifth row RO5 and the first column CO1 and a second resistance line 1511 located in the sixth row RO6 and the first column CO1 may be electrically connected to each other by a fourth connection line 1551 located between the fifth row RO5 and the sixth row RO6.

A second resistance line 1511 located in the sixth row RO6 and the seventh column CO7 and a second resistance line 1511 located in the seventh row RO7 and the seventh column CO7 may be electrically connected to each other by a fourth connection line 1551 located between the sixth row RO6 and the seventh row RO7.

A second resistance line 1511 located in the seventh row RO7 and the first column CO1 and a second resistance line 1511 located in the eighth row RO8 and the first column CO1 may be electrically connected to each other by a fourth connection line 1551 located between the seventh row RO7 and the eighth row RO8.

That is, the second resistance lines 1511 located in the sensing area SA may all be connected in series to each other by the third connection lines 1531 and the fourth connection lines 1551.

Although the fourth connection lines 1551 are all located within the sensing area SA in the drawings, the present disclosure is not limited to this case. At least a portion of each of the fourth connection lines 1551 located on a left side of the sensing area SA in the drawings can also be located in a peripheral area NSA.

The dummy electrodes 191 may be located in first openings OP1 of the first touch electrodes 121. In some exemplary embodiments, the dummy electrodes 191 may be disposed in the first openings OP1, respectively. Like the dummy electrodes 190 (see FIG. 3) described above, the dummy electrodes 191 may reduce a difference in external light reflectance, thereby reducing the possibility of pattern stains being visible from the outside.

In some exemplary embodiments, the dummy electrodes 191 may have the same shape as the first openings OP1.

The dummy electrodes 191 may be disposed in the first openings OP1 and spaced apart from the first touch electrodes 121. Each of the dummy electrodes 191 may be an island pattern. In some exemplary embodiments, each of the dummy electrodes 191 may be a floating electrode.

The dummy electrodes 191 may be located in the same first layer L1 as the first touch electrodes 121, the second touch electrodes 131 and the second resistance lines 1511 and may be made of the same material as the first touch electrodes 121, the second touch electrodes 131 and the second resistance lines 1511.

In some exemplary embodiments, when the second touch electrodes 131 have a mesh structure, the dummy electrodes 191 may also have a mesh structure.

In some exemplary embodiments, a first signal line 9111 may be connected to an end of the strain gauge 150-1. For example, the first signal line 9111 may be connected to a second resistance line 1511 located in the eighth row RO8 and the seventh column CO7 in the strain gauge 150-1.

In some exemplary embodiments, a second signal line 9113 may be connected to the other end of the strain gauge 150-1. For example, the second signal line 9113 may be connected to a second resistance line 1511 located in the first row RO1 and the seventh column CO7 in the strain gauge 150-1.

The strain gauge 150-1 may be connected to a Wheatstone bridge circuit WB (see FIG. 22) by the first signal line 9111 and the second signal line 9113 as described above.

The area of each of the second openings OP2 may be larger than the area of each of the first openings OP1, and the length of one of second resistance line 1511 may be greater than the length of one of first resistance line 151 illustrated in FIG. 3. Therefore, in the current embodiment, when touch inputs of the same pressure occur, a change in the resistance of the strain gauge 150-1 may be larger than a change in the resistance of the strain gauge 150 (see FIG. 3). That is, the current embodiment has the advantage of improving pressure detection sensitivity in addition to the effects described above.

In some exemplary embodiments, the structure of the touch sensor TSM-2, in particular, the position of the second resistance lines 1511 may be changed.

Figure 32:
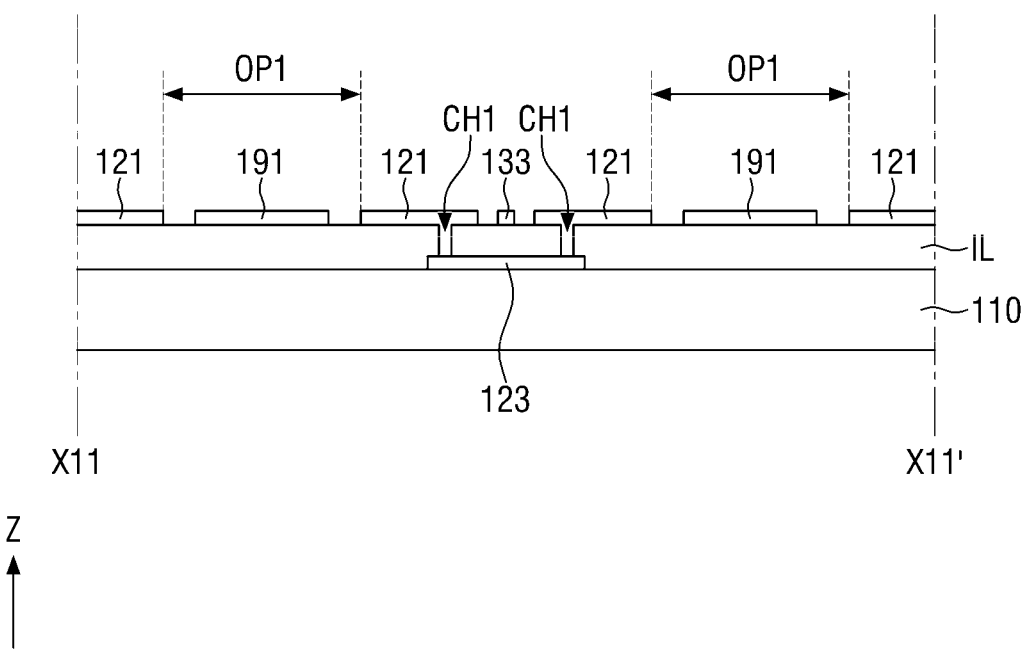
FIG. 32 is a cross-sectional view illustrating a modified structure of FIG. 28.
Figure 33:
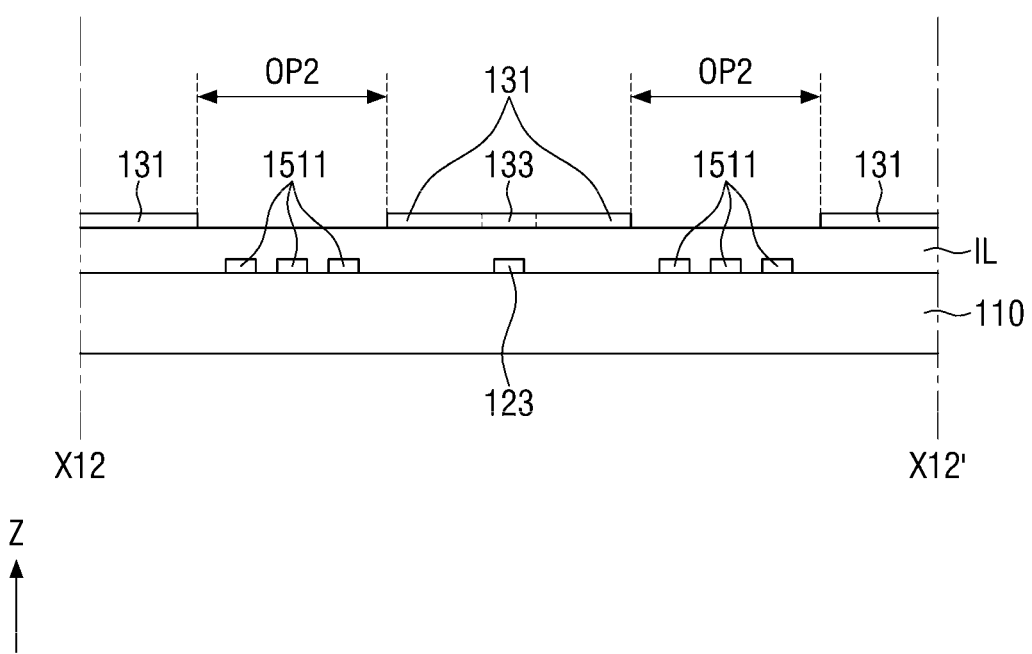
FIG. 33 is a cross-sectional view illustrating a modified structure of FIG. 29.
Figure 34:
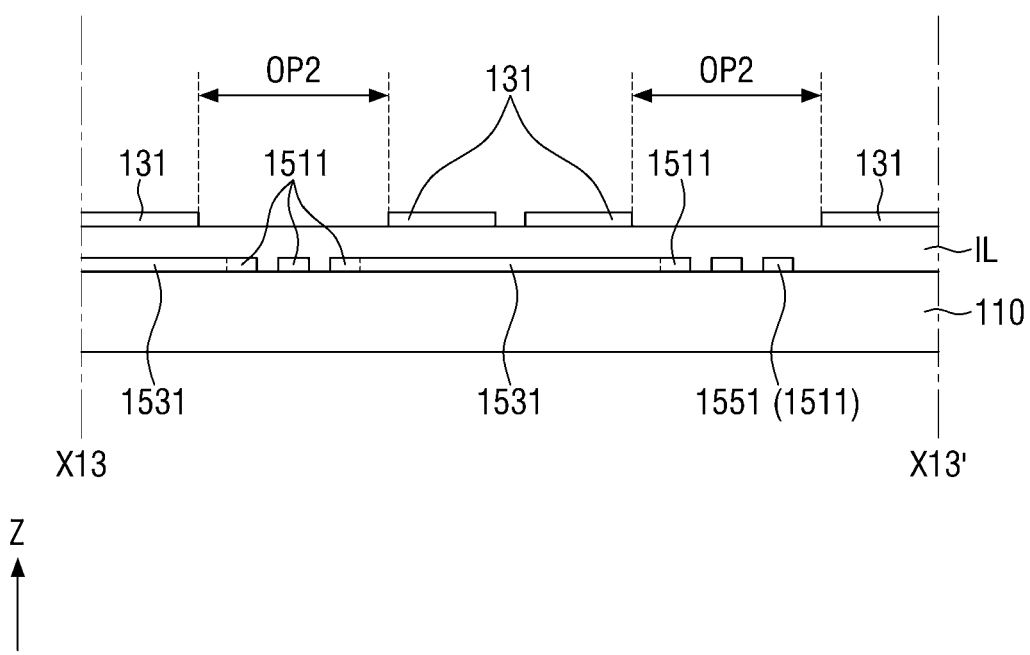
FIG. 34 is a cross-sectional view illustrating a modified structure of FIG. 30.
Figure 35:
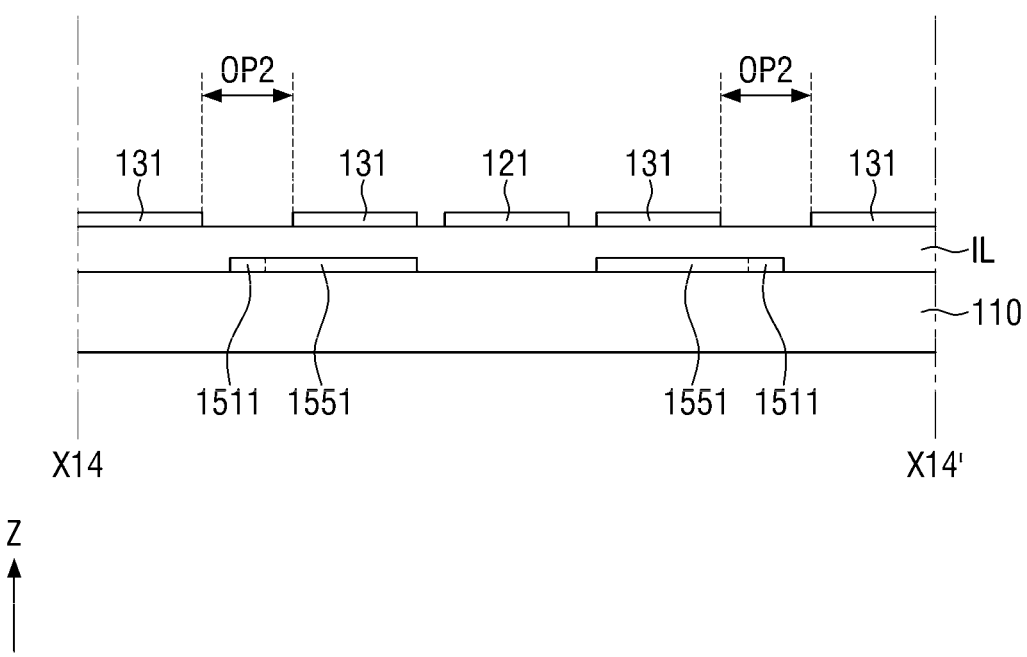
FIG. 35 is a cross-sectional view illustrating a modified structure of FIG. 31.

FIG. 32 is a cross-sectional view illustrating a modified structure of FIG. 28. FIG. 33 is a cross-sectional view illustrating a modified structure of FIG. 29. FIG. 34 is a cross-sectional view illustrating a modified structure of FIG. 30. FIG. 35 is a cross-sectional view illustrating a modified structure of FIG. 31. Referring to FIGS. 32 through 35 in addition to FIGS. 24 through 31, in some exemplary embodiments, second resistance lines 1511 may be located in a different layer from second touch electrodes 131, unlike in FIGS. 24 through 31. For example, the second resistance lines 1511 may be located in the same second layer L2 as a third connection line 1531, a fourth connection line 1551 and a first connection portion 123. When the second resistance lines 1511 are located in the second layer L2, they may be made of the same material as the third connection line 1531, the fourth connection line 1551 and the first connection portion 123 and may be formed together with the third connection line 1531, the fourth connection line 1551 and the first connection portion 123.

Figure 36:
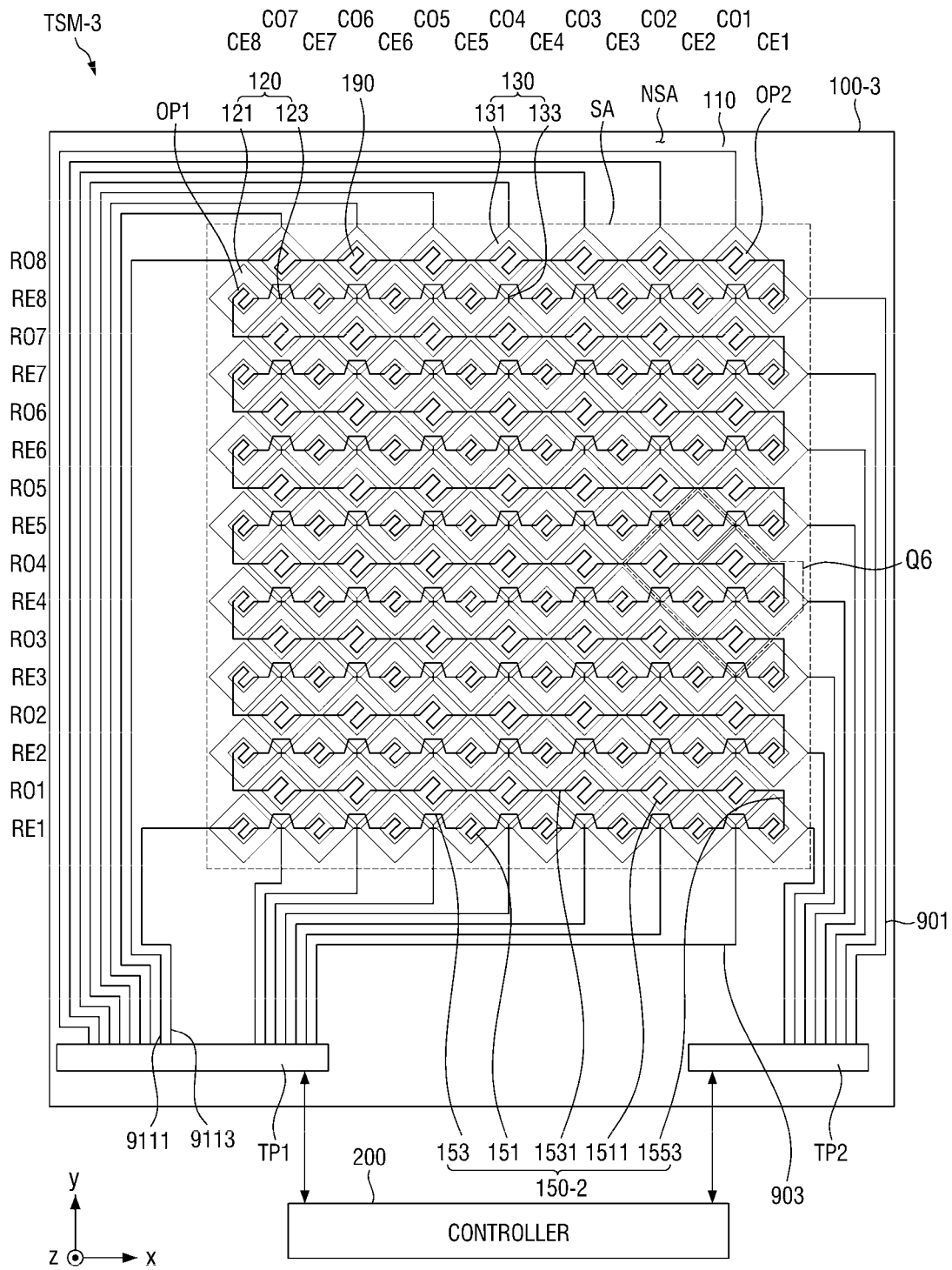
FIG. 36 is a plan view of a sensor unit of a touch sensor according to an exemplary embodiment and illustrates the connection relationship between the sensor unit and a controller.
Figure 37:
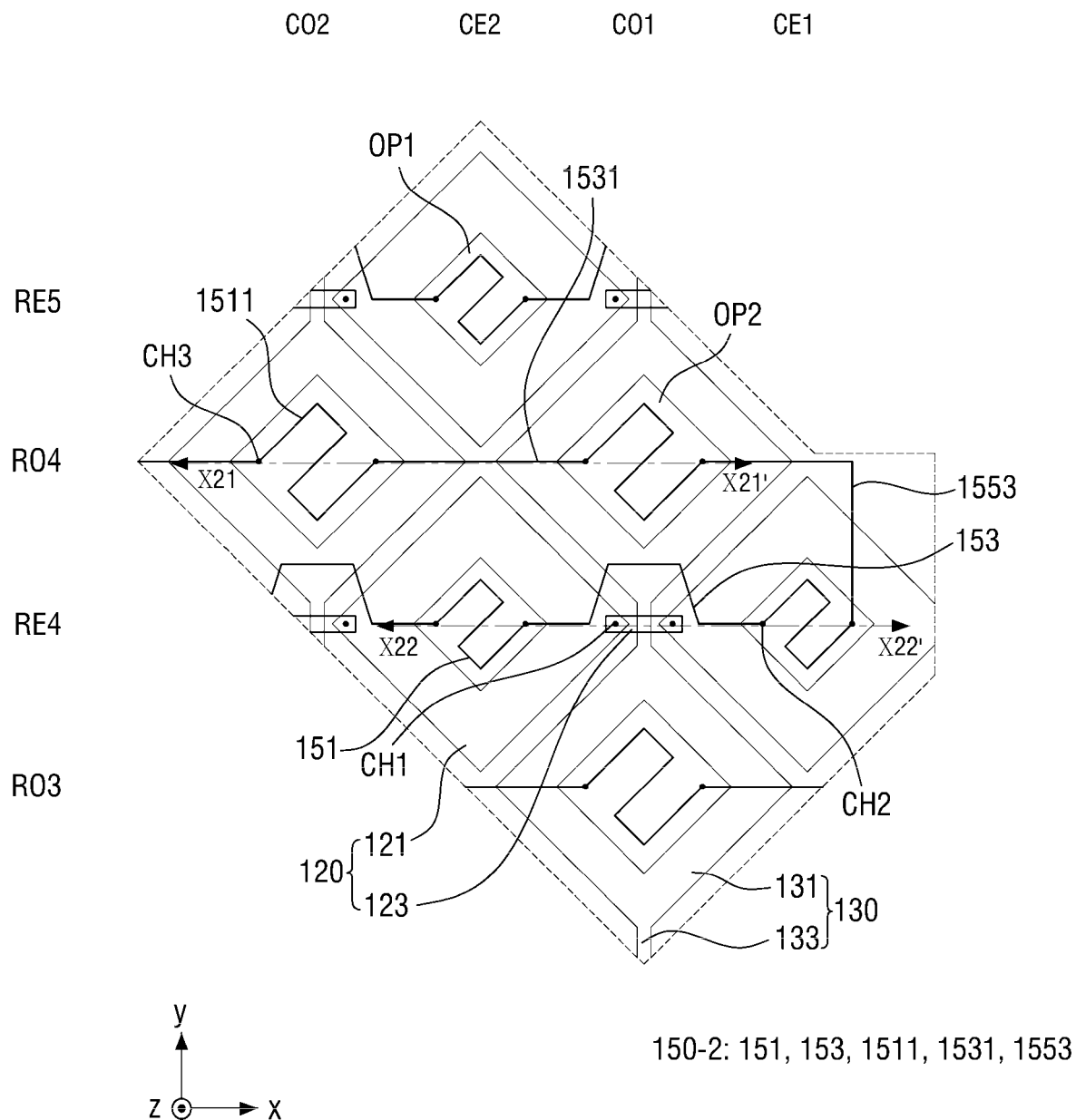
FIG. 37 is an enlarged view of a portion Q6 of FIG. 36.
Figure 38:
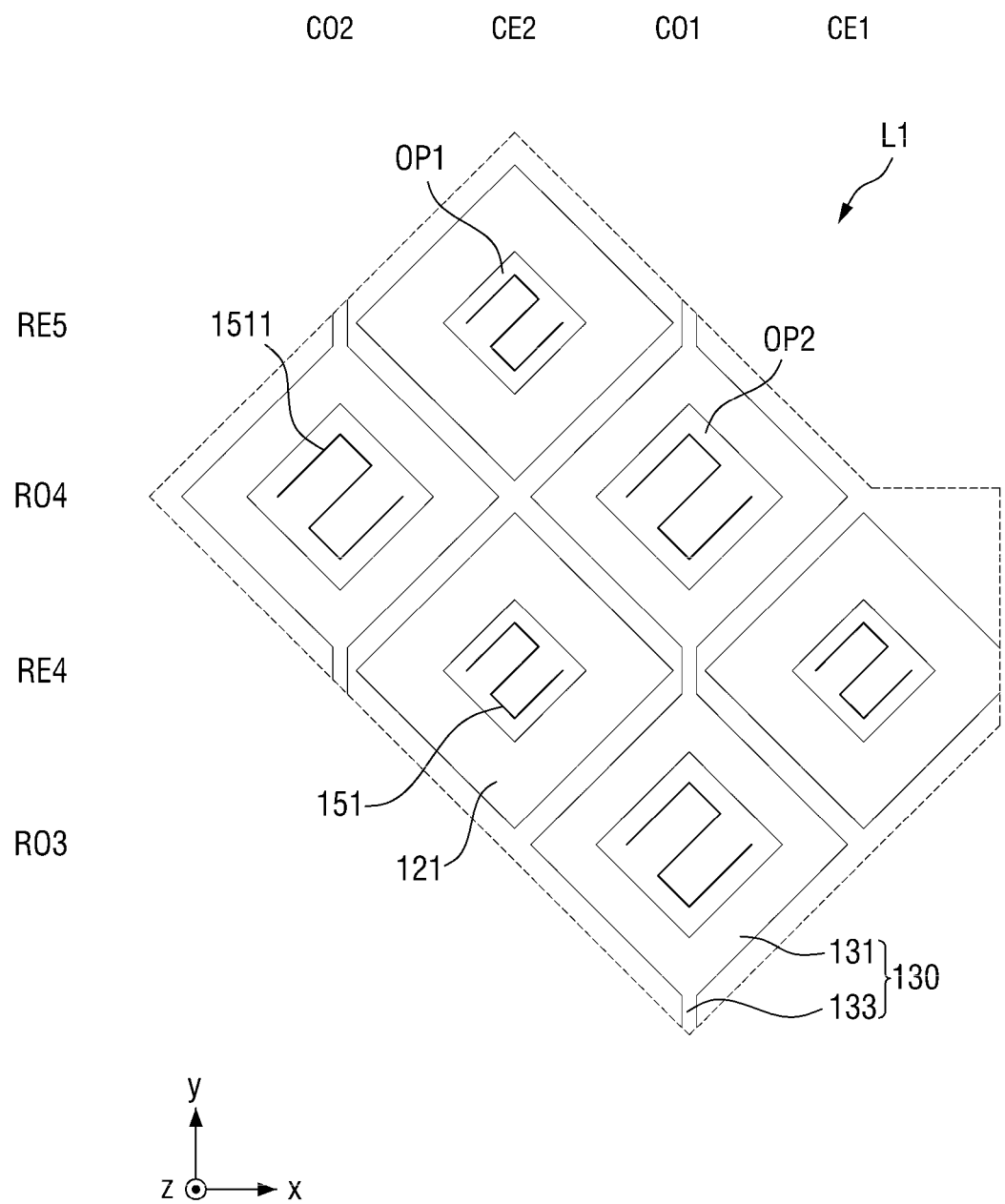
FIG. 38 illustrates the structure of a first layer of the sensor unit of FIG. 37.
Figure 39:
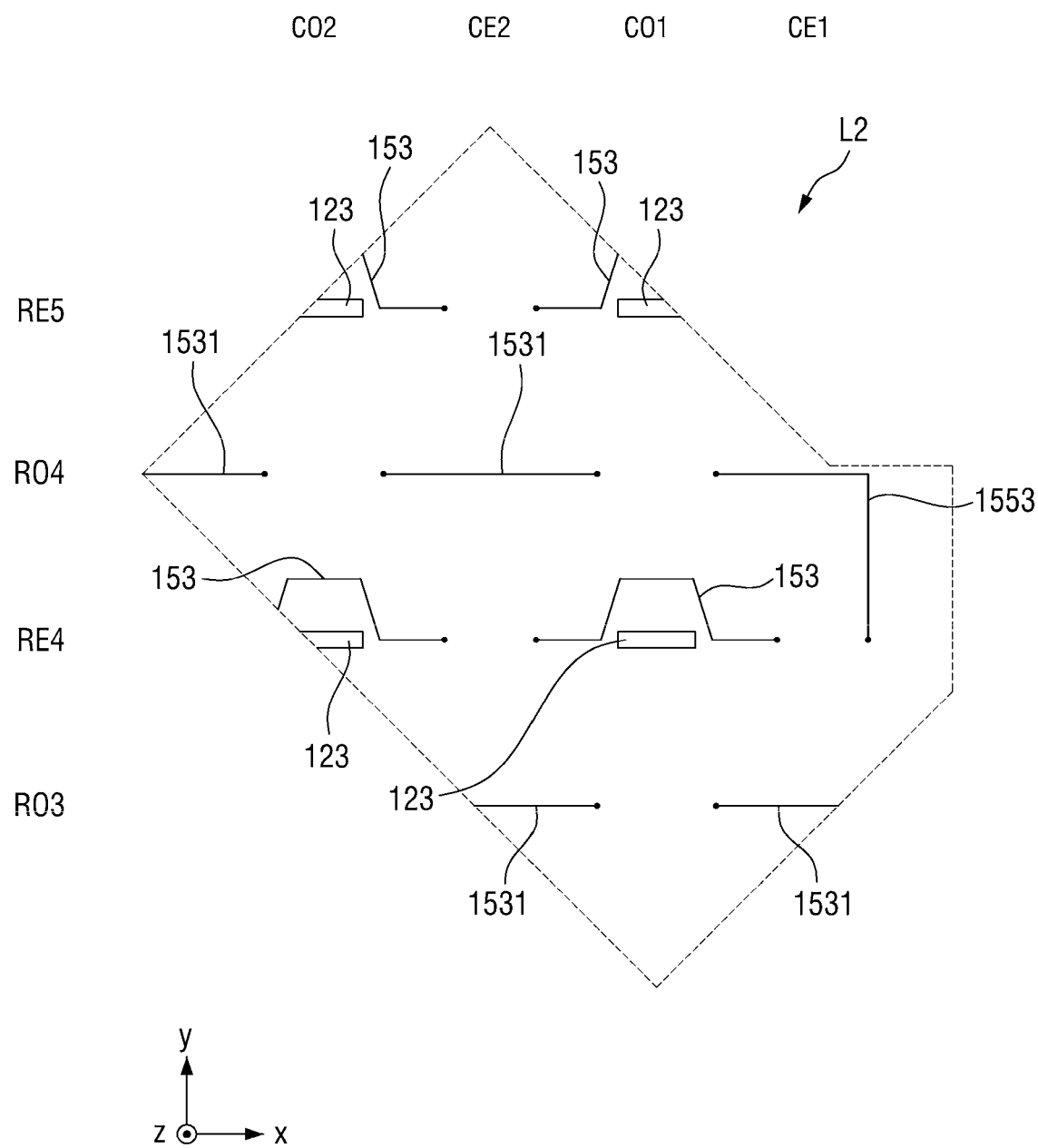
FIG. 39 illustrates the structure of a second layer of the sensor unit of FIG. 37.
Figure 40:
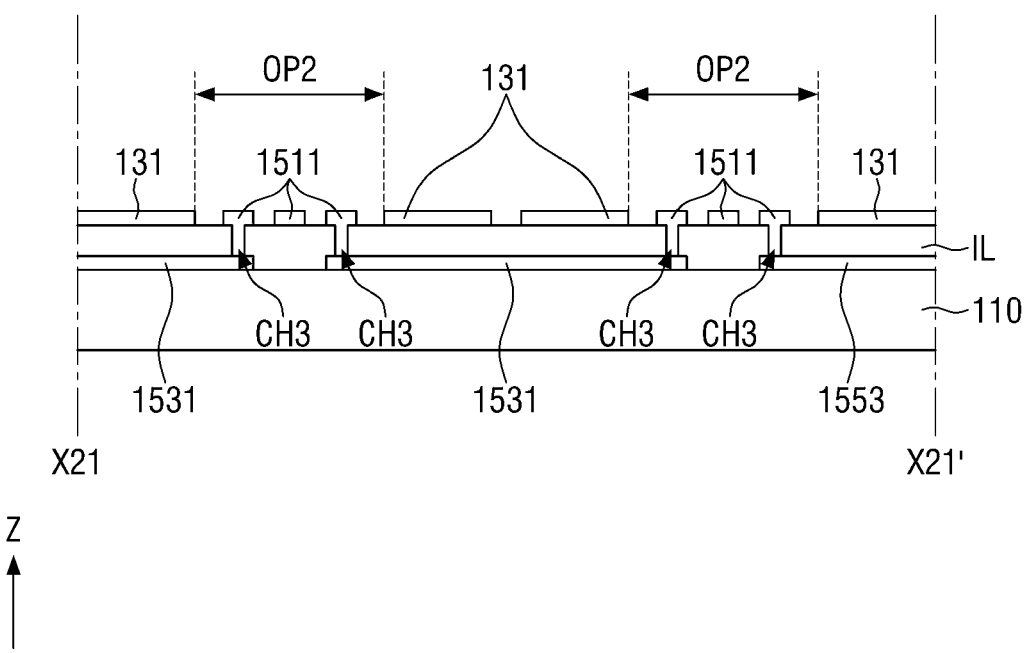
FIG. 40 is a cross-sectional view taken along a sectional line X21-X21' of FIG. 37.
Figure 41:
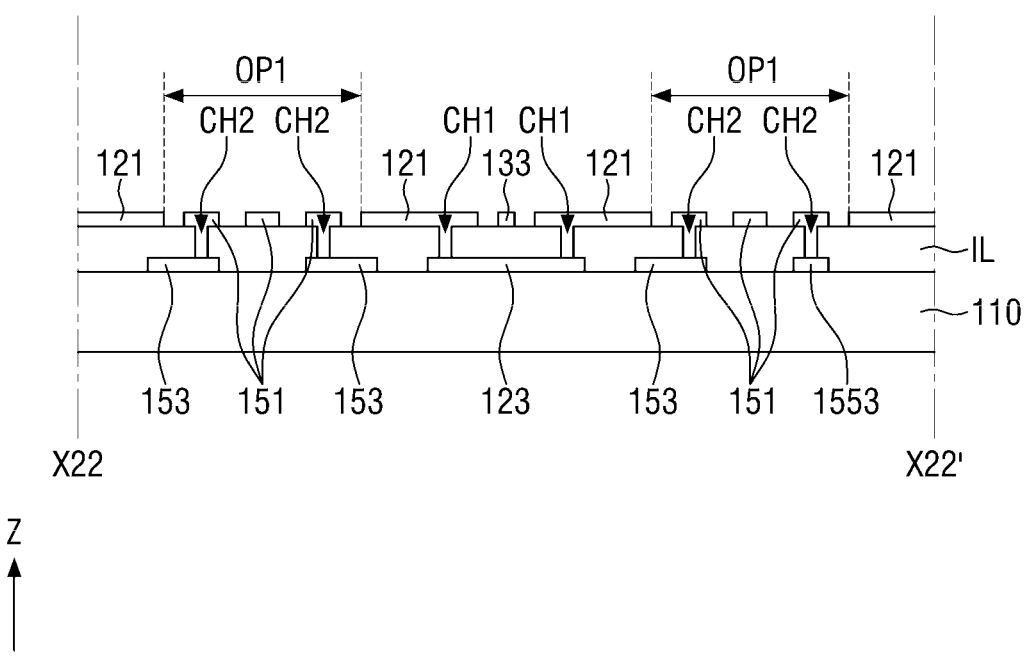
FIG. 41 is a cross-sectional view taken along a sectional line X22-X22' of FIG. 37.

FIG. 36 is a plan view of a sensor unit 100-3 of a touch sensor TSM-3 according to an exemplary embodiment and illustrates the connection relationship between the sensor unit 100-3 and a controller 200. FIG. 37 is an enlarged view of a portion Q6 of FIG. 36. FIG. 38 illustrates the structure of a first layer L1 of the sensor unit 100-3 of FIG. 37. FIG. 39 illustrates the structure of a second layer L2 of the sensor unit 100-3 of FIG. 37. FIG. 40 is a cross-sectional view taken along a sectional line X21-X21' of FIG. 37. FIG. 41 is a cross-sectional view taken along a sectional line X22-X22' of FIG. 37.

Referring to FIGS. 36 through 41, the touch sensor TSM-3 according to the current embodiment includes the sensor unit 100-3 and the controller 200.

The sensor unit 100-3 is substantially the same as or similar to the sensor unit 100 of FIG. 3 except that it includes a strain gauge 150-2 and does not include dummy electrodes (190 in FIG. 3). Therefore, differences will be mainly described below.

The strain gauge 150-2 may be located within a sensing area SA and may be located in rows formed by first touch electrode members 120 and rows formed by second touch electrodes 131 of second touch electrode members 130. For example, the strain gauge 150-2 may be located in a first electrode row RE1, a first row RO1, a second electrode row RE2, a second row RO2, a third electrode row RE3, a third row RO3, a fourth electrode row RE4, a fourth row RO4, a fifth electrode row RE5, a fifth row RO5, a sixth electrode row RE6, a sixth row RO6, a seventh electrode row RE7, a seventh row RO7, an eighth electrode row RE8 and an eighth row RO8.

The strain gauge 150-2 may include first resistance lines 151, second resistance lines 1511, first connection lines 153, third connection lines 1531, and fifth connection lines 1553.

The first resistance lines 151 may be located in first openings OP1 of first touch electrodes 121, and each of the first connection lines 153 may connect the first resistance lines 151 neighboring each other along the first direction X.

The second resistance lines 1511 may be located in second openings OP2 of the second touch electrodes 131. Each of the third connection lines 1531 may connect the second resistance lines 1511 neighboring each other along the first direction X.

In some exemplary embodiments, the first resistance lines 151, the second resistance lines 1511, the first touch electrodes 121 and the second touch electrodes 131 may be located in the first layer L1, and the first connection lines 153, the third connection lines 1531 and first connection portions 123 may be located in the second layer L2.

Other features of the first resistance lines 151, the second resistance lines 1511, the first connection lines 153 and the third connection lines 1531 may be substantially the same as those described above, and thus their description is omitted.

Each of the fifth connection lines 1553 may electrically connect a first resistance line 151 and a second resistance line 1511 located in rows neighboring each other along the second direction Y and may directly contact the first resistance line 151 and the second resistance line 1511.

In some exemplary embodiments, each of the fifth connection lines 1553 may connect a first resistance line 151 and a second resistance line 1511 neighboring each other along the second direction Y and located at ends of neighboring rows.

In some exemplary embodiments, the second resistance lines 1511 and the fifth connection lines 1553 may contact each other through third contact holes CH3 formed in an insulating layer IL, and the first resistance lines 151 and the fifth connection lines 1553 may contact each other through second contact holes CH2 formed in the insulating layer IL. The fifth connection lines 1553 may be spaced apart from first touch electrode members 120 and the second touch electrode members 130 without contacting the first touch electrode members 120 and the second touch electrode members 130. In some exemplary embodiments, the fifth connection lines 1553 may be located in the same second layer L2 as the first connection portions 123 and may be made of the same material as the first connection portions 123.

The exemplary connection relationship between the fifth connection lines 1553, the first resistance lines 151 and the second resistance lines 1511 may be as follows.

A first resistance line 151 located in the first electrode row RE1 and a first electrode column CE1 and a second resistance line 1511 located in the first row RO1 and a first column CO1 may be electrically connected to each other by a fifth connection line 1553 located between the first electrode row RE1 and the first row RO1.

A second resistance line 1511 located in the first row RO1 and a seventh column CO7 and a first resistance line 151 located in the second electrode row RE2 and an eight electrode column CE8 may be electrically connected to each other by a fifth connection line 1553 located between the second electrode row RE2 and the first row RO1.

A structure similar to the above-described structure may be repeated. For example, when n is a natural number of 2 to 8, a first resistance line 151 located in an $n^{th}$ electrode row and the first electrode column CE1 and a second resistance line 1511 located in an $n^{th}$ row and the first column CO1 may be connected to each other by a fifth connection line 1553 located between the $n^{th}$ electrode row and the $n^{th}$ row. In addition, a second resistance line 1511 located in the $n^{th}$ row and the seventh col CO7 and a first resistance line 151 located in an $(n+1)^{th}$ electrode row and the eighth electrode column CE8 may be connected to each other by a fifth connection line 1553 located between the $n^{th}$ row and the $(n+1)^{h}$ electrode row.

That is, the first resistance lines 151 and the second resistance lines 1511 located in the sensing area SA may all be connected in series to each other by the first connection lines 153, the third connection lines 1531 and the fifth connection lines 1553.

Although the fifth connection lines 1553 are all located in the sensing area SA in the drawings, the present disclosure is not limited to this case. In some exemplary embodiments, a portion of each of the fifth connection lines 1553 may be located in a peripheral area NSA.

In some exemplary embodiments, a first signal line 9111 may be connected to an end of the strain gauge 150-2. For example, the first signal line 9111 may be connected to a second resistance line 1511 located in the eighth row RO8 and the seventh column CO7 in the strain gauge 150-2.

In some exemplary embodiments, a second signal line 9113 may be connected to the other end of the strain gauge 150-2. For example, the second signal line 9113 may be connected to a first resistance line 151 located in the first electrode row RE1 and the eighth electrode column CE8 in the strain gauge 150-2.

The strain gauge 150-2 may be connected to a Wheatstone bridge circuit WB (see FIG. 22) by the first signal line 9111 and the second signal line 9113 as described above.

In the current embodiment, the first resistance lines 151 are disposed in the first openings OP1, and the second resistance lines 1511 are disposed in the second openings OP2. Accordingly, this can increase a touch pressure detectable area and increase the change in the resistance of the strain gauge 150-2 due to pressure, thereby improving pressure detection sensitivity.

In some exemplary embodiments, the structure of the touch sensor TSM-3, in particular, the positions of the first resistance lines 151 and the second resistance lines 1511 may be changed.

Figure 42:
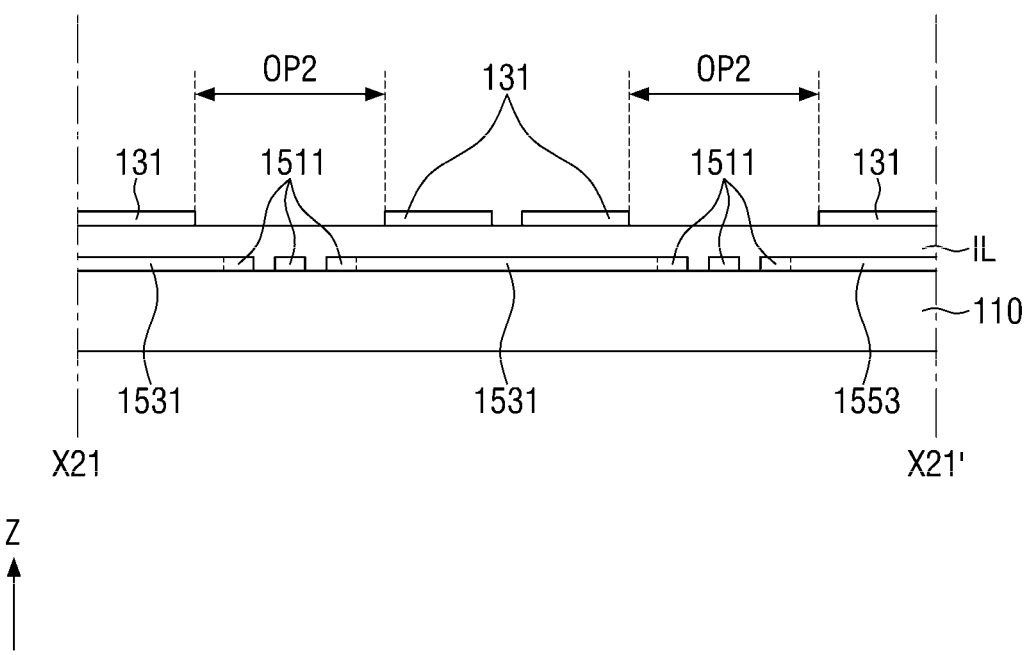
FIG. 42 is a cross-sectional view illustrating a modified structure of FIG. 40
Figure 43:
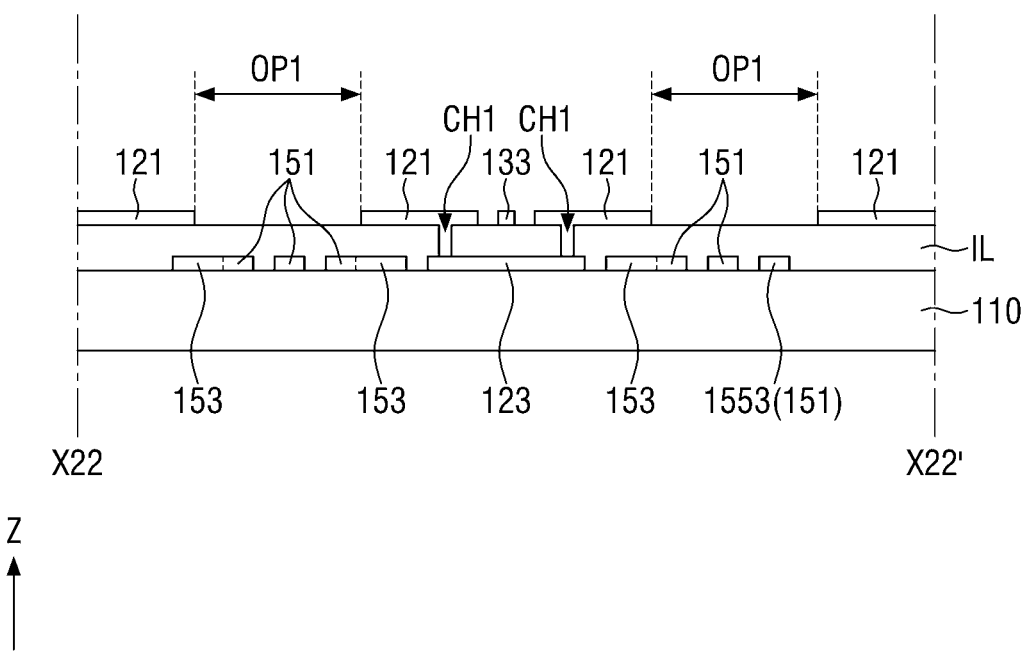
FIG. 43 is a cross-sectional view illustrating a modified structure of FIG. 41.

FIG. 42 is a cross-sectional view illustrating a modified structure of FIG. 40. FIG. 43 is a cross-sectional view illustrating a modified structure of FIG. 41. Referring to FIGS. and 43 in addition to FIGS. 36 through 41, in some exemplary embodiments, first resistance lines 151 and second resistance lines 1511 may be located in a different layer from first touch electrodes 121 and second touch electrodes 131, unlike in FIGS. 36 through 41. For example, the first resistance lines 151 and the second resistance lines 1511 may be located in the same second layer L2 as a first connection line 153, a third connection line 1531 and a first connection portion 123. When the first resistance lines 151 and the second resistance lines 1511 are located in the second layer L2, they may be made of the same material as the first connection line 153, the third connection line 1531 and the first connection portion 123 and may be formed together with the first connection line 153, the third connection line 1531 and the first connection portion 123 in the same process.

The relative positions of the first resistance lines 151 and the second resistance lines 1511 can be various changed. For example, the first resistance lines 151 may be located in a first layer L1, and the second resistance lines 1511 may be located in the second layer L2. Alternatively, the first resistance lines 151 may be located in the second layer L2, and the second resistance lines 1511 may be located in the first layer L1.

Figure 44:
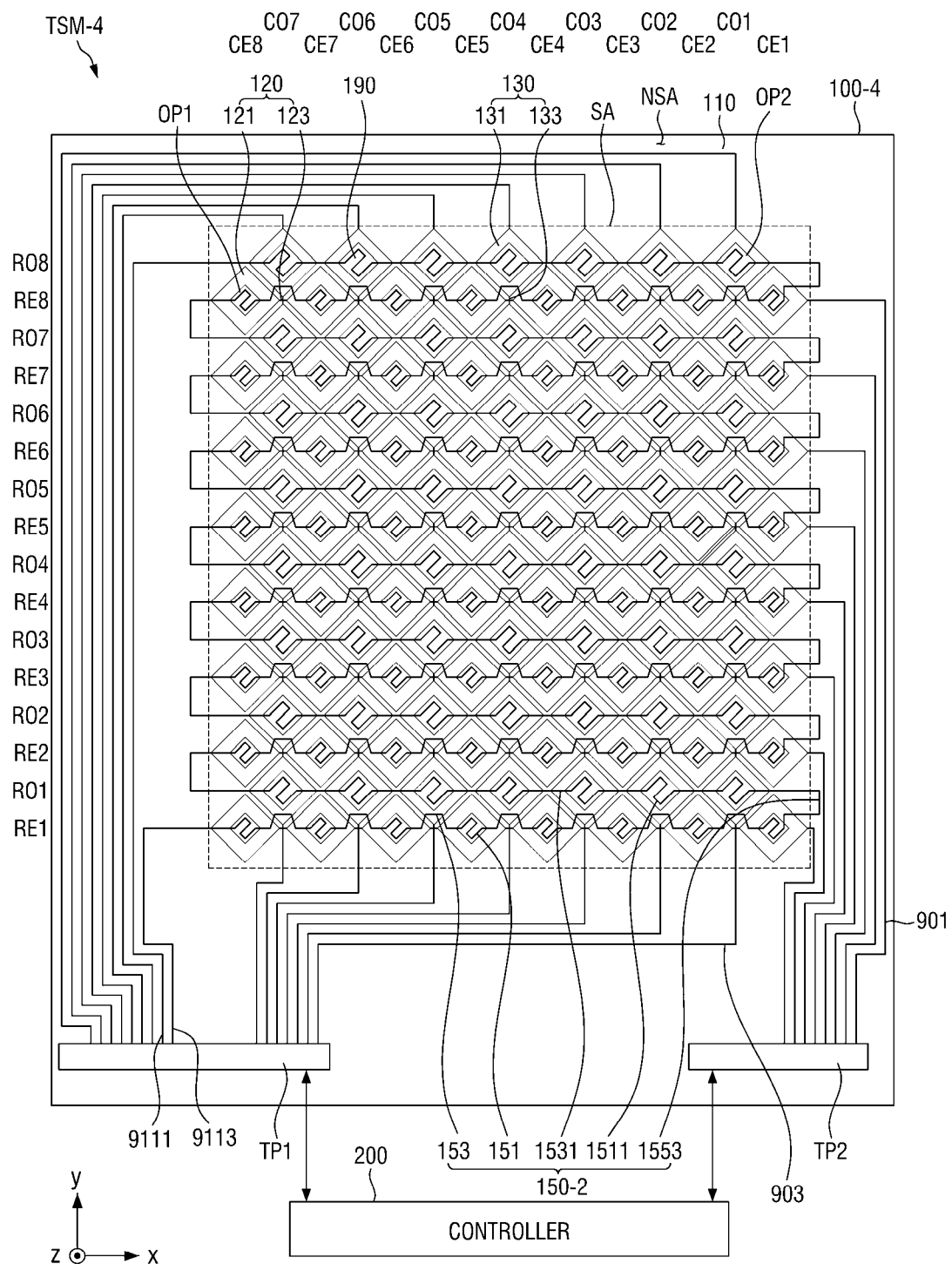
FIG. 44 is a plan view of a sensor unit of a touch sensor according to an exemplary embodiment and illustrates the connection relationship between the sensor unit and a controller.

FIG. 44 is a plan view of a sensor unit 100-4 of a touch sensor TSM-4 according to an exemplary embodiment and illustrates the connection relationship between the sensor unit 100-4 and a controller 200.

Referring to FIG. 44, the current embodiment is different from the exemplary embodiment of FIG. 36 in the configuration of the sensor unit 100-4 of the touch sensor TSM-4. More specifically, the current embodiment is substantially the same as or similar to the exemplary embodiment of FIG. 36 except that a portion of each fifth connection line 1553 included in the sensor unit 100-4 is located in a peripheral area NSA. Therefore, a redundant description is omitted.

In a touch sensor according to any of the above-described embodiments and a display device including the touch sensor, since a strain gauge is located in the touch sensor, the intensity of pressure can be detected even without a pressure sensor. In addition, the strain gauge can be formed in the process of manufacturing touch electrodes and connection portions, and the addition of the strain gauge does not increase the thickness of the touch sensor. Further, since the strain gauge can replace physical input buttons or can be used in combination with physical input buttons, various user interfaces can be provided to a user.

According to embodiments, it is possible to provide a touch sensor capable of sensing not only the position of a touch input but also the pressure of the touch input and a display device including the touch sensor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor comprising:
 a base layer;
 first touch electrode members, each of the first touch electrode members comprising:
  first touch electrodes arranged on the base layer along a first direction and electrically connected to each other along the first direction, and a first connection portion connecting two of the first touch electrodes neighboring each other along the first direction; and
  first openings, each of the first touch electrodes comprising one of the first openings;
 second touch electrode members, each of the second touch electrode members comprising:
  second touch electrodes arranged on the base layer along a second direction and electrically connected to each other along the second direction, the second direction intersecting the first direction, and a second connection portion connecting two of the second touch electrodes neighboring each other along the second direction; and
 a strain gauge comprising rows of resistance lines arranged along the second direction, each of the rows of resistance lines comprising: resistance lines arranged in the first direction and electrically connected to each other along the first direction,
 wherein each of the first touch electrode members are arranged and spaced apart from each other along the second direction,
 wherein the resistance lines are located in the first openings, respectively,
 wherein two neighboring rows of resistance lines are electrically connected to each other,
 wherein the strain gauge further comprises a first connection line connecting two neighboring resistance lines in the same row of resistance lines,
 wherein the touch sensor further comprises an insulating layer disposed on the base layer, the insulating layer including a first surface facing the base layer and a second surface opposite to the first surface,
 wherein one of the first connection portion and the second connection portion is disposed between the first surface of the insulating layer and the base layer,
 wherein the other one of the first connection portion and the second connection portion is disposed directly on the second surface of the insulating layer, and
 wherein the first touch electrodes, the second touch electrodes and the resistance lines are disposed directly on the second surface of the insulating layer.

2. The touch sensor of claim 1, wherein each of the rows of resistance lines comprises: the resistance lines all connected to each other in series.

3. The touch sensor of claim 1, wherein a resistance line located at a distal end of a first row of resistance lines and a resistance line located at a distal end of a second row of resistance lines adjacent to the first row of resistance lines along the second direction are electrically connected to each other.

4. The touch sensor of claim 3, wherein the resistance line located at the distal end of the first row of resistance lines and the resistance line located at the distal end of the second row of resistance lines are disposed in the same electrode column.

5. The touch sensor of claim 1, wherein the first touch electrodes, the second touch electrodes and the resistance lines are all located in a first layer and made of the same material.

6. The touch sensor of claim 5,
wherein the strain gauge further comprises:
a second connection line connecting two neighboring resistance lines located at respective distal ends of different rows of resistance lines neighboring each other along the second direction,
wherein one of the first connection portion and the second connection portion is located in a second layer different from the first layer,
wherein the other one of the first connection portion and the second connection portion is located in the first layer, and
wherein the first connection line and the second connection line are located in the second layer.

7. The touch sensor of claim 6,
wherein the second connection line is disposed between the base layer and the first surface of the insulating layer.

8. The touch sensor of claim 1, further comprising: a plurality of branches located in each of the first openings and connected to each of the resistance lines, spaced apart from each other,
wherein the branches are made of the same material as the resistance lines.

9. The touch sensor of claim 1, further comprising: a controller connected to the first touch electrode member, the second touch electrode member and the strain gauge,
wherein the controller is configured to:
detect a position of a touch input based on a change in capacitance between a first touch electrode and a second touch electrode caused by the touch input; and
detect a pressure of the touch input based on a change in a resistance value of the strain gauge caused by the touch input.

10. The touch sensor of claim 9, wherein the controller comprises a Wheatstone bridge circuit which is electrically connected to the strain gauge.

11. The touch sensor of claim 10, further comprising:
a first signal line electrically connecting a first end of the strain gauge and the Wheatstone bridge circuit; and
a second signal line electrically connecting a second end of the strain gauge and the Wheatstone bridge circuit,
wherein a sensing area in which the first touch electrodes, the second touch electrodes and the resistance lines are located and a peripheral area which is located around the sensing area are defined in the base layer, and
wherein the first signal line and the second signal line are located in the peripheral area and are all located on a side of the sensing area.

12. The touch sensor of claim 10, wherein the Wheatstone bridge circuit comprises:
a first node configured to receive a driving voltage and electrically connected to a first end of the strain gauge;
a second node configured to receive a reference voltage;
a first output node which is electrically connected to a second end of the strain gauge;
a second output node;
a first resistor connected between the second node and the second output node;
a second resistor connected between the first node and the second output node; and
a third resistor connected between the second node and the first output node.

13. The touch sensor of claim 12, wherein the resistance value of the strain gauge, a resistance value of the first resistor, a resistance value of the second resistor, and a resistance value of the third resistor are substantially equal when a touch input is not applied.

14. The touch sensor of claim 1, further comprising: a plurality of dummy electrodes disposed directly on the second surface of the insulating layer,
wherein each of the second touch electrodes comprises a second opening,
wherein the first touch electrodes, the second touch electrodes, and the resistance lines are all located in a first layer,
wherein the dummy electrodes are located in the second openings, spaced apart from the second touch electrodes and are located in the first layer, and
wherein the first touch electrodes, the second touch electrodes, the resistance lines, and the dummy electrodes are made of the same material.

15. The touch sensor of claim 14, wherein an area of each of the second openings is larger than that of each of the first openings.

16. The touch sensor of claim 1, wherein the second touch electrodes are driving electrodes, and the first touch electrodes are sensing electrodes.

17. A touch sensor comprising:
a base layer;
first touch electrode members, each of the first touch electrode members comprising: first touch electrodes arranged on the base layer along a first direction and electrically connected to each other along the first direction, and a first connection portion connecting two of first touch electrodes neighboring each other along the first direction;
second touch electrode members, each of the second touch electrode members comprising:
second touch electrodes arranged on the base layer along a second direction intersecting the first direction and electrically connected to each other along the second direction, and a second connection portion connecting two of second touch electrodes neighboring each other along the second direction; and
first openings, each of the second touch electrodes comprising one of the first openings; and
a strain gauge comprising rows of resistance lines arranged along the second direction, each of the rows of resistance lines comprising: resistance lines arranged in the first direction and electrically connected to each other along the first direction,
wherein each of the second touch electrode members are arranged and spaced apart from each other along the first direction,
wherein the resistance lines are located in the first openings, respectively,
wherein two neighboring rows of resistance lines are electrically connected to each other,
wherein the strain gauge further comprises a first connection line connecting two neighboring resistance lines in the same row of resistance lines,
wherein the touch sensor further comprises an insulating layer disposed on the base layer, the insulating layer including a first surface facing the base layer and a second surface opposite to the first surface, wherein one of the first connection portion and the second connection portion is disposed between the first surface of the insulating layer and the base layer, wherein the other one of the first connection portion and the second connection portion is disposed directly on the second surface of the insulating layer, and wherein the first touch electrodes, the second touch electrodes and the resistance lines are disposed directly on the second surface of the insulating layer.

18. The touch sensor of claim 17, wherein each of the rows of resistance lines comprises: the resistance lines all connected to each other in series.

19. The touch sensor of claim 17, wherein a resistance line located at a distal end of a first row of resistance lines and a resistance line located at a distal end of a second row of resistance lines adjacent to the first row of resistance lines along the second direction are electrically connected to each other.

20. The touch sensor of claim 17,
wherein the first touch electrodes and the second touch electrodes are all located in a first layer,
wherein one of the first connection portion and the second connection portion is located in a second layer different from the first layer,
wherein the other one of the first connection portion and the second connection portion is located in the first layer, and
wherein the resistance lines are located in the first layer.

21. The touch sensor of claim 20,
wherein the second touch electrodes and the resistance lines are made of the same material.

22. The touch sensor of claim 20, wherein the strain gauge further comprises:
a second connection line connecting two neighboring resistance lines located in different rows of resistance lines neighboring each other along the second direction, and
wherein the second connection line is disposed between the first surface of the insulating layer and the base layer.

23. The touch sensor of claim 17, further comprising a plurality of dummy electrodes disposed directly on the second surface of the insulating layer on the base layer,
wherein each of the first touch electrodes comprises a second opening,
wherein the first touch electrodes, the second touch electrodes, and the resistance lines are all located in a first layer,
wherein the dummy electrodes are located in the second openings, spaced apart from the first touch electrodes and are located in the first layer, and
wherein the first touch electrodes, the second touch electrodes, the resistance lines, and the dummy electrodes are made of the same material.

24. A touch sensor comprising:
a base layer;
first touch electrode members, each of the first touch electrode members comprising:
first touch electrodes arranged on the base layer along a first direction and electrically connected to each other along the first direction, and a first connection portion connecting two of first touch electrodes neighboring each other along the first direction;
first openings, each of the first touch electrodes comprising one of the first openings;
second touch electrode members, each of the second touch electrode members comprising:

second touch electrodes arranged on the base layer along a second direction intersecting the first direction and electrically connected to each other along the second direction, and a second connection portion connecting two of second touch electrodes neighboring each other along the second direction;
second openings, each of the second touch electrodes comprising one of the second openings; and
a strain gauge comprising:
rows of first resistance lines arranged along the second direction, each of the rows of first resistance lines comprising: first resistance lines arranged in the first direction and electrically connected to each other along the first direction; and
rows of second resistance lines arranged along the second direction, each of the rows of second resistance lines comprising: second resistance lines arranged in the first direction and electrically connected to each other along the first direction,
wherein each of the first touch electrode members arranged and are spaced apart from each other along the second direction,
wherein each of the second touch electrode members arranged and are spaced apart from each other along the first direction,
wherein the first resistance lines are located in the first openings and spaced apart from the first touch electrodes, respectively, and the second resistance lines are located in the second openings and spaced apart from the second touch electrodes, respectively,
wherein one of the first resistance lines and one of the second resistance lines neighbor each other along the second direction are electrically connected to each other,
wherein the strain gauge further comprises: a connection line connecting a first resistance line located at a distal end of a row of first resistance line and a second resistance line located at a distal end of a row of second resistance line adjacent to the row of first resistance line along the second direction,
wherein the touch sensor further comprises an insulating layer disposed on the base layer, the insulating layer including a first surface facing the base layer and a second surface opposite to the first surface,
wherein one of the first connection portion and the second connection portion is disposed between the first surface of the insulating layer and the base layer,
wherein the other one of the first connection portion and the second connection portion is disposed directly on the second surface of the insulating layer,
wherein the first touch electrodes, the second touch electrodes, the first resistance lines and the second resistance lines are disposed directly on the second surface of the insulating layer, and
wherein the connection line is disposed between the first surface of the insulating layer and the base layer.

25. The touch sensor of claim 24, wherein the first touch electrodes, the second touch electrodes, the first resistance lines, and the second resistance lines are made of the same material.

26. The touch sensor of claim 24, wherein a length of each of the second resistance lines is different from that of each of the first resistance lines.

27. The touch sensor of claim 26, wherein an area of each of the second openings is larger than that of each of the first openings, and the length of each of the second resistance lines is greater than that of each of the first resistance lines.

28. A display device comprising:
- a base substrate;
- a light emitting element located on the base substrate;
- a thin-film encapsulation layer located on the light emitting element;
- an insulating layer disposed on the thin-film encapsulation layer, the insulating layer including a first surface facing the thin-film encapsulation layer and a second surface opposite to the first surface;
- touch electrodes disposed directly on the second surface of the insulating layer, each of the touch electrodes comprising an opening; and
- a strain gauge comprising:
    - resistance lines located in the openings, respectively, the resistance lines disposed directly on the second surface of the insulating layer and having variable resistance values changed in response to a touch input;
    - a first connection line connecting two resistance lines neighboring each other along a first direction; and
    - a second connection line connecting two resistance lines neighboring each other along a second direction, the second direction intersecting the first direction,
- wherein the first connection line and the second connection line are disposed between the thin-film encapsulation layer and the first surface of the insulating layer.

29. The display device of claim 28, wherein the thin-film encapsulation layer comprises:
- a first encapsulating inorganic layer located on the light emitting element;
- an encapsulating organic layer located on the first encapsulating inorganic layer; and
- a second encapsulating inorganic layer located on the encapsulating organic layer, wherein the insulating layer is located on the second encapsulating inorganic layer.

* * * * *